(12) United States Patent
Kurihara et al.

(10) Patent No.: US 8,031,282 B2
(45) Date of Patent: Oct. 4, 2011

(54) ACTIVE MATRIX SUBSTRATE AND DISPLAY DEVICE

(75) Inventors: Ryuji Kurihara, Taki-gun (JP); Yuhko Hisada, Matsusaki (JP); Toshihide Tsubata, Tsu (JP); Masanori Takeuchi, Tsu (JP); Tomokazu Ohtsubo, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 757 days.

(21) Appl. No.: 12/062,584

(22) Filed: Apr. 4, 2008

(65) Prior Publication Data
US 2008/0192161 A1 Aug. 14, 2008

Related U.S. Application Data

(63) Continuation of application No. 11/042,971, filed on Jan. 25, 2005, now Pat. No. 7,375,773.

(30) Foreign Application Priority Data

Jan. 28, 2004 (JP) ................................. 2004-020489
Dec. 1, 2004 (JP) ................................. 2004-349031

(51) Int. Cl.
*G02F 1/136* (2006.01)
(52) U.S. Cl. ....................................................... 349/43
(58) Field of Classification Search ...................... 349/43
See application file for complete search history.

(56) References Cited

U.S. PATENT DOCUMENTS 5,668,650 A 9/1997 Mori et al.
6,091,466 A * 7/2000 Kim et al. ........................ 349/43

FOREIGN PATENT DOCUMENTS

| CN | 1327167 A | 12/2001 |
| JP | 06-160908 A | 6/1994 |
| JP | 10-260429 A | 9/1998 |

OTHER PUBLICATIONS

Kurihara et al.; "Active Matrix Substrate and Display Device"; U.S. Appl. No. 11/042,971, filed Jan. 25, 2005.

* cited by examiner

*Primary Examiner* — James Dudek
(74) *Attorney, Agent, or Firm* — Keating & Bennett, LLP

(57) ABSTRACT

An active matrix substrate has a structure that prevents a drain extraction line from breaking without a plurality of active elements such as thin film transistor elements, metal-insulator-metal elements, MOS transistor elements, diodes, and varistors being disposed, and is suited for use in a large-size liquid crystal television or a like liquid crystal display device equipped with a large-size liquid crystal display panel. The active matrix substrate includes an active element connected, via a drain extraction line, to a storage capacitor upper electrode, wherein the drain extraction line has at least two routes.

19 Claims, 24 Drawing Sheets

ACTIVE MATRIX SUBSTRATE AND DISPLAY DEVICE

REFERENCE TO RELATED APPLICATIONS

This Nonprovisional application claims priority under 35 U.S.C. §119(a) to Patent Application No. 2004-020489 filed in Japan on Jan. 28, 2004 and No. 2004-349031 filed in Japan on Dec. 1, 2004, the entire contents of which are hereby incorporated by reference.

BACKGROUND OF THE INVENTION

1. Field of the Invention

The present invention relates to an active matrix substrate to be used in a display device, such as a liquid crystal display device or EL (electroluminescence) display device. More particularly, it relates to an active matrix substrate suited for use in large-size liquid crystal television or a like liquid crystal display device equipped with a large-size liquid crystal display panel.

2. Description of the Related Art

Active matrix substrates are widely used in active matrix drive type display devices such as liquid crystal display devices and electroluminescence (EL) display devices. In such active matrix drive type display devices, active elements are disposed to form a matrix on respective independent pixel electrodes, and screen displaying is made by the active matrix drive method according to which ones of the pixel electrodes are selectively driven by these active elements. Generally used as the active elements for selective driving of pixel electrodes are TFT (thin film transistors) elements, MIM (metal-insulator-metal) elements, MOS transistor elements, diodes, and varistors, among others, and screen displaying is made by switching the voltage applied to each pixel electrode and the corresponding opposing electrode to thereby optically modulate the display medium, such as a liquid crystal layer, EL display layer or plasma radiation layer, between both the electrodes. Such active matrix drive method enables high contrast displaying and is in practical use in liquid crystal televisions, personal computer terminal display devices, and so forth.

As the conventional active matrix substrate for use in a liquid crystal display device using such active matrix drive method, one in which the drain electrode of a TFT element is connected to the corresponding pixel electrode via a drain extraction line and a contact hole has been disclosed (cf., e.g., Japanese Kokai Publication H10-20298, pages 3 and 6, FIG. 1). In this conventional display device, only one drain extraction line is formed for each pixel on the active matrix substrate and, in case of breaking of this one drain extraction line, the normal display of the corresponding pixel is not made any longer, which leads to the occurrence of an operation failure called pixel defect; the result is a decrease in the yield of liquid display devices. This is explained referring to the drawings. In the conventional active matrix substrate for a liquid display device, as shown in FIG. 13-1, breaking 22 of one drain extraction line, as shown in FIG. 13-2, results in inhibition of a data signal 21 from arriving at a pixel electrode for transmission from a source bus line 5 via a drain electrode 1 and the drain extraction line 2. As a result, a pixel defect occurs, and this lowers the display quality of the liquid display device and causes a decrease in yield. As the cause of drain extraction line breaking, there may be mentioned, among others, a photo resist pattern defect in wiring pattern formation, and a defect in layer deposition in drain extraction line layer formation by sputtering, for instance.

As a technology of preventing the occurrence of pixel defects, a liquid crystal display device has been disclosed in which each pixel is provided with a plurality of thin film transistors (cf., e.g., Japanese Kokai Publication H07-199221, pages 3 and 6, FIG. 1 and Japanese Kokai Publication 2002-350901, pages 13 and 20, FIG. 9). However, to provide each pixel with a plurality of thin film transistors causes a decrease in aperture ratio and an increase in production cost; in these respects, there is room for improvement.

Further, a liquid crystal display device or the like in which an interconnection line (bridge) is disposed between two neighboring pixel electrodes to cope with the occurrence of a pixel defect by connecting the electrode of the defective pixel to the electrode of the neighboring normal pixel by means of that interconnection line has been disclosed (cf. e.g. Japanese Kokai Publication H02-135320, pages 3 and 4, drawing 1 and Japanese Kokai Publication H08-328035, pages 3 and 5, drawing 1). According to this technology, however, the interconnection line is disposed so as to extend across the gate line, so that the gray scale characteristics are deteriorated due to the increase in coupling capacity; in this respect, there is room for improvement.

In recent years, the liquid display panels in liquid crystal televisions and so forth have become larger and larger in size and, accordingly, the number of pixels has been increased; as a result, there is a tendency for the number of pixel defects to increase. The size of pixels is also increasing with the increase in size of the screen and, therefore, even when an abnormal bright spot, if discovered in the manufacturing process, is converted to a dark spot, as is conventional in the art, users will be able to readily recognize, by the eye, not only the luminescent spot but also the dark spot as a pixel defect. Under such circumstances, a novel technology has been demanded for improving the display quality by effectively inhibiting pixel defects from occurring and thereby improving the yield.

SUMMARY OF THE INVENTION

In order to overcome the problems described above, preferred embodiments of the present invention provide an active matrix substrate in which drain extraction lines of active elements can be prevented from breaking while suppressing the decrease in aperture ratio and the increase in manufacturing cost, and a display device using such substrate.

As a result of various investigations made by them in an attempt to create an active matrix substrate in which drain extraction lines of active elements can be prevented from breaking, the present inventors came to realize that when each drain extraction line is provided with at least two routes, the possibility of an active element being insulated from the corresponding storage capacitor upper electrode by breaking of a portion of the corresponding drain extraction line can be satisfactorily reduced without lowering the aperture ratio or increasing the manufacturing cost. Based on this discovery, preferred embodiments of the present invention have been completed.

Thus, a preferred embodiment of the present invention provides an active matrix substrate including an active element connected, via a drain extraction line, to a storage capacitor upper electrode, wherein the drain extraction line has at least two routes.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1-2 is a schematic plan view illustrating a condition of drain line breaking 22 in the active matrix substrate shown in FIG. 1-1.

FIG. 2 is a schematic sectional view illustrating the section along the broken line A-A' of the active matrix substrate shown in FIG. 1-1.

FIG. 5-1 is a schematic plan view illustrating another example of the branched structure in the active matrix substrate according to a preferred embodiment of the present invention.

FIG. 5-2 is a schematic plan view illustrating the result of drain line breaking 22 in the active matrix substrate shown in FIG. 5-1.

FIG. 6-1 is a schematic plan view illustrating an example of the branched structure in the active matrix substrate according to a preferred embodiment of the present invention in which three drain electrodes 1 are provided for each pixel.

FIG. 6-2 is a schematic plan view illustrating the result of drain line breaking 22 in the active matrix substrate shown in FIG. 6-1.

FIG. 7-1 is a schematic plan view illustrating an example of the branched structure in the active matrix substrate of the invention in which a dummy TFT element 20 is employed.

FIG. 7-2 is a schematic plan view illustrating the result of drain line breaking 22 in the active matrix substrate shown in FIG. 7-1.

FIG. 11-1 is a schematic plan view illustrating an example of the branched structure in the active matrix substrate according to a preferred embodiment of the present invention in which a divided pixel (subpixel) structure is employed.

FIG. 11-2A is a schematic representation of signal waveforms to be applied to a bright subpixel, FIG. 11-2B is a schematic representation of signal waveforms to be applied to a dark subpixel, and FIG. 11-2C is a schematic representation of signal waveforms to be applied to both subpixels after drain/drain interconnection. In the figures, CS1, CS2 and CS:DC denote the Cs signal waveforms to be applied to the bright subpixel, dark subpixel and synthesized subpixel, respectively; Drain 1, Drain 2 and Drain 3 denote the drain signal waveforms to be applied to the bright subpixel, dark subpixel and synthesized subpixel, respectively, and Gate denotes the gate signal waveform.

FIG. 11-3 is a representation of V-T characteristics of the respective subpixels before drain/drain interconnection and after drain/drain interconnection.

FIG. 11-4A is an ordinary gray-scale image pattern in the active matrix substrate shown in FIG. 11-1, and FIG. 11-4B is a gray-scale image pattern upon drain/drain interconnection of the subpixel on line 2, column 2 and the subpixel on line 3, column 2.

FIG. 12-1 is a schematic plan view illustrating an example of the branched structure in the active matrix substrate according to a preferred embodiment of the present invention in which a divided pixel structure is employed.

FIG. 12-2A is an ordinary gray-scale image pattern in the active matrix substrate shown in FIG. 12-1, and FIG. 12-2B is a gray-scale image pattern upon drain/drain interconnection of the subpixels in column 2.

FIG. 13-1 is a schematic plan view illustrating an example of the structure of the drain extraction line 2 in the active matrix substrate constituting the conventional liquid crystal display device.

FIG. 13-2 is a schematic plan view illustrating the result of drain line breaking 22 in the active matrix substrate shown in FIG. 13-1.

DETAILED DESCRIPTION OF PREFERRED EMBODIMENTS

Figure 1:
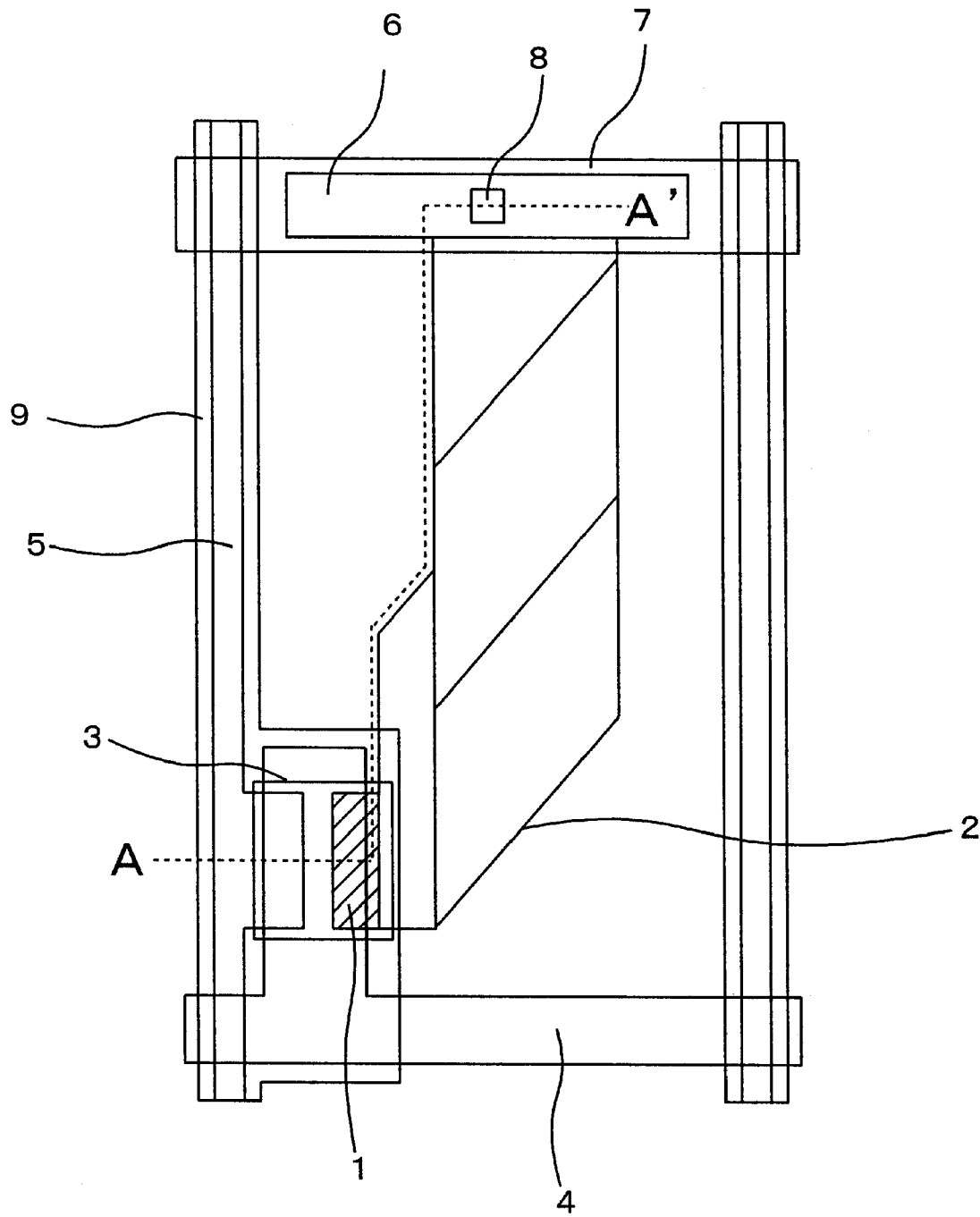
FIG. 1-1 is a schematic plan view illustrating an example of the branched structure in the active matrix substrate according to a preferred embodiment of the present invention.

As the above-mentioned active elements, there may be mentioned, among others, TFT (thin film transistor) elements, MIM (metal-insulator-metal) elements, MOS transistor elements, diodes, and varistors. When TFT elements, for instance, are used, they are arranged, to form a matrix, at points of crossing of scanning signal lines and data signal lines, each scanning signal line is connected to each corresponding gate electrode, each data signal line is connected to each corresponding source electrode, and a drain extraction line is connected to the drain electrode. In this way, it is possible to cause scanning signals successively fed to a plurality of scanning signal lines crossing a plurality of data signal lines to sample data signals simultaneously fed to the data signal lines and thus use the active elements as switches for selectively driving pixel electrodes. The material of the drain extraction lines is not particularly restricted but may be any conductive material. Preferably used are films of such metals as titanium, chromium, aluminum and molybdenum, or alloys of such metals, and laminates thereof. As for the method of forming drain extraction lines, the method of forming them by subjecting such a metal layer or laminate as mentioned above to photolithography and etching is preferably used.

Suited for use as the storage capacitor upper electrodes are those each of which is provided so as to oppose a storage capacitor lower electrode including a storage capacitor line or scanning signal line or the like at least via an insulation layer and constitute a storage capacitor (Cs) element therewith. The storage capacitor element can be used for storing the data signal fed to the data signal line since the storage capacitor upper electrode is connected to the active element via the drain extraction line.

The constitution of the active matrix substrate according to a preferred embodiment of the present invention is not particularly restricted but may include another or other constituent elements provided that it is constituted of those constituent elements mentioned above as essential ones. However, the mode of practice in which each pixel electrode is connected to the corresponding storage capacitor upper electrode via a contact hole is desirable. In this mode of practice, it becomes possible to optically modulate the display medium, such as a liquid crystal layer, EL emission layer or plasma radiation layer, to make screen displaying by applying a voltage switched by each active element between the corresponding pixel electrode and the opposing electrode opposite thereto. To form the contact hole on the storage capacitor upper electrode on the storage capacitor lower electrode pattern is preferred since any further decrease in aperture ratio will not result then.

In accordance with a preferred embodiment of the present invention, each drain extraction line preferably has at least two routes. As the form of such drain extraction line, there may be mentioned (1) the form in which one drain extraction line connected to the active element is branched into two or more lines and each of them is connected to the storage capacitor upper electrode, (2) the form in which two or more drain extraction lines connected to the active element are joined into one line and connected to the storage capacitor upper electrode, and (3) the form in which two or more drain extraction lines connected to the active element, with or without cross-linking, are connected to the storage capacitor upper electrode. Among them, the form (3) is preferred. By giving such a form to the drain extraction line in accordance with a preferred embodiment of the present invention, it becomes possible to satisfactorily reduce the possibility of the active element being insulated from the storage capacitor upper electrode due to breaking of a portion of the drain extraction line, since the signal from the active element is now sent to the storage capacitor upper electrode via two or more conducting routes. The above-mentioned drain extraction line wiring pattern is preferably one connecting the drain electrode of the active element to the storage capacitor upper electrode via two or more routes and, when the active element has two or more drain electrodes, each of the two or more drain electrodes of the active element is preferably connected to the storage capacitor upper electrode via two or more routes. When such active matrix substrates are used as the pixel electrode substrates for use in such display devices as liquid crystal display devices and EL (electroluminescence) display devices, the occurrence of pixel defects in images displayed as resulting from drain extraction line breaking can be effectively prevented, the display quality of the display devices can be prevented from lowering, and the yield can be improved.

Some preferred embodiments of the active matrix substrate of the present invention are described below.

In the practice of a preferred embodiment of the present invention, the drain extraction line is preferably disposed at those sites corresponding to a protrusion and/or an electrode-free area provided on at least one of the active matrix substrate and the substrate facing the active matrix substrate. Thus, in the practice of a preferred embodiment of the present invention, the protrusion and/or electrode-free area pattern is preferably at least partly overlapping the drain extraction line pattern. In cases where the substrate facing the active matrix substrate is provided with protrusions and/or electrode-free areas, it is preferred that the protrusion and/or electrode-free area pattern and the drain extraction wiring pattern be at least partly overlapping with each other in the state of panel alignment of the active matrix substrate and opposite substrate. As the protrusions, there may be mentioned, among others, those formed in the form of ribs, for instance, on the opposing faces of both the substrates. As the electrode-free areas, there may be mentioned, among others, those formed in the form of slits, for instance, in the pixel electrodes on the active matrix substrate or the common electrode on the substrate facing the active matrix substrate. Such forms are preferably used in applying the active matrix substrate of a preferred embodiment of the present invention to a liquid crystal display device in which liquid crystal molecules are horizontally or vertically aligned between both the active matrix substrate and color filter substrate when no voltage is applied and to a liquid crystal display device under the MVA (multi-domain vertical alignment) system where liquid crystal molecules are vertically aligned between both the substrates when no voltage is applied and each pixel is divided into a plurality of domains and, in this case, the protrusions and electrode-free areas are preferably utilized for controlling the alignment of liquid crystal molecules. By disposing the drain extraction lines at positions corresponding to the protrusions and/or electrode-free areas, which are generally not used effectively as aperture areas, in the practice of a preferred embodiment of the present invention, the aperture ratio can be pre-vented from lowering due to making each drain extraction line have a plurality of routes. In a more preferred embodiment, the drain extraction lines are disposed at positions corresponding to the protrusions. When the drain extraction lines are disposed at positions corresponding to the electrode-free areas in the active matrix substrate, there arise the possibilities of the effect of the electrode-free areas in controlling the alignment of liquid crystal molecules becoming lessened and the speed of response of liquid crystal molecules being reduced.

The MVA system is a system under which each pixel is divided into a plurality of domains so that the viewing angle characteristics of a vertical alignment type liquid crystal display device may be improved. In the liquid crystal display device on the MVA system, bank-like protrusions (protrusion for alignment control) are generally formed on the respective facing surfaces of two substrates, and the direction of tilting of liquid crystal molecules is specified and the domain border positions are restricted by means of those alignment controlling protrusions.

In a preferred embodiment of the present invention, each of the active elements preferably has at least two drain electrodes. Such wiring structure of active elements can be appropriately combined with the form in which two or more drain extraction lines are connected to each active element. In such a structure, it is possible to more satisfactorily produce the effects and advantages of preferred embodiments of the present invention while preventing the aperture ratio from lowering due to provision of a plurality of active elements for each pixel. In other words, that an active element has two or more drain electrodes is equivalent to the fact that the active element has the same number of, namely two or more, channels as the drain electrodes. Therefore, in this preferred embodiment, even if a defect, such as short circuiting, is found in a certain channel, an attempt can be made to amend the defective pixel by utilizing another normal channel in the same active element. More specifically, in case of a leak (short circuiting) between the source electrode and drain electrode in a certain channel, for instance, the drain extraction line connected to that channel is cut off from the drain electrode, and the drain extraction line cut off is connected to the drain extraction line connected to a normal channel (drain/drain interconnection), whereby almost the same drain potential can be applied to all the drain extraction lines.

The number of gate electrodes may be one or two or more.

From the viewpoint of prevention of the aperture ratio from lowering, one active element is preferably provided in each driving area (pixel or subpixel). In the preferred embodiment in which two or more active elements are provided in each driving area, the drain extraction line pattern is preferably arranged such that each of the drain electrodes of the two or more active elements is connected to the storage capacitor upper electrode via two or more routes.

The active matrix substrate according to a preferred embodiment of the present invention preferably has a structure such that a pixel is constituted of at least two subpixels and the pixel electrodes in the at least two subpixels have a structure such that they are connected to the respective different drain electrodes each via a storage capacitor upper electrode and a drain extraction line. Such a preferred embodiment in which each pixel (picture element) is constituted of two or more subpixels, namely the mode of embodiment utilizing the so-called divided pixel system, is advantageous from the viewpoint of amendment of defective pixels, such as bright defects.

In cases where the above divided pixel system is applied, each pixel preferably comprises subpixels differing in brightness. In this preferred embodiment in which both a bright subpixel and a dark subpixel exist in each pixel, intermediate gray scales can be expressed by means of area gradation and, therefore, this mode is suitable for attaining improvements with respect to the whitening on the liquid crystal display panel at oblique viewing angles. Briefly, the area gradation is effected by capacity coupling of the liquid crystal capacity (Clc), the Cs capacity (Ccs), and the polarity and amplitude (Vsd) of Cs, and this is expressed by the formula "capacity of bright subpixel=Vs+K(Vs)×Vsd, K=Ccs/Clc(Vs)+Ccs", where Vs is the voltage value of the signal fed from the source.

Further, in cases where the divided pixel system is applied, the active matrix substrate according to a preferred embodiment of the present invention is preferably arranged such that at least two storage capacitor lower electrodes have a structure such that they are overlapping, via an insulation layer, with the respective storage capacitor upper electrodes corresponding to different subpixels. Such a preferred embodiment is suitable for forming bright subpixels and dark subpixels. The term "signal voltages opposite in phase to each other to be applied to two or more storage capacitor lower electrodes" means the Cs waveform voltages used for operating the area gradation in each pixel with a divided pixel structure and includes two species, namely the Cs waveform voltage (Cs polarity+) contributing to pushing up the drain signal voltage (Vs) fed from the source at timing for capacity coupling when the gate signal is off, and the Cs waveform voltage (Cs polarity−) contributing to pushing down the Vs. In such divided pixel system (area gradation technology), it is possible to vary the effective voltage applied to each pixel on a subpixel by subpixel basis by capacity coupling of the Cs waveform voltage, Cs capacity and liquid crystal capacity to thereby form bright and dark subpixels and thus realize multiple driving of these. The details of such divided pixel system (area gradation technology) are disclosed in Japanese Kokai Publication 2004-62146, for instance.

As the divided pixel structure, there may be mentioned, for example, the 1:1 pixel division structure in which the area of the bright subpixel and the area of the dark area are equal to each other, and the 1:3 pixel division structure in which the area of the bright subpixel is one third the area of the dark subpixel. Among them, the 1:3 pixel division structure is particularly effective as a measure for whitening at oblique viewing angles.

The active matrix substrate according to a preferred embodiment of the present invention is preferably one in which there is provided, for each pixel, an interconnection electrode for amendment having a structure overlapping, via an insulation layer, with at least two drain extraction lines connected to respective different drain electrodes. In this preferred embodiment, even when a defect is found in a channel involving a thin film transistor, for instance, it is possible to cut off the drain extraction line connected to that channel from the drain electrode and then connect the drain extraction line cut off to a drain extraction line connected to a normal channel (drain/drain interconnection) to thereby apply almost the same drain potential to the pixel electrode of the subpixel whose defect has been corrected and that of the subpixel used for defect correction. The layer in which the interconnection electrode for amendment is formed is preferably the same layer as that in which the scanning signal line (gate bus line) is formed, and the interconnection electrodes are preferably formed in the form islands simultaneously with the patterning of the scanning signal lines.

In the above-mentioned preferred embodiment in which interconnection electrodes for amendment are provided, the active matrix substrate according to a preferred embodiment of the present invention preferably has a structure such that any two of the storage capacitor upper electrodes overlapping, via an insulation layer, with the corresponding storage capacitor lower electrode to which signal voltages opposite in phase to each other are to be applied are interconnected via a drain extraction line and an interconnection electrode for amendment. According to this preferred embodiment, the storage capacitor upper electrodes overlapping the storage capacitor lower electrode to which Cs signals (electric signals fed to the storage capacitor lower electrode) given as signal voltages opposite in phase to each other are to be applied are connected to each other; therefore, in the synthetic subpixel newly formed by the subpixel whose defect has been corrected and the subpixel used for the amendment, it becomes possible to apply direct current voltage Cs signals to the storage capacitor element synthesized, with the result that gradation characteristics intermediate between both can be obtained and a gray scale equivalent to that of the surrounding ordinary pixels can be obtained.

In such a preferred embodiment, for securing the display quality of the pixel including the synthetic subpixel, the storage capacitor upper electrode connected to the drain extraction line and interconnection electrode for amendment is preferably connected to the pixel electrode of the neighboring subpixel. The storage capacitor lower electrode is preferably provided as an independent wiring pattern (storage capacitor wiring pattern), and this makes it possible to secure the degree of freedom in driving pattern selection.

The interconnected structure mentioned above is to be formed only partly in those pixels showing a defect but need not be formed in all pixels.

The active matrix substrate according to a preferred embodiment of the present invention has a structure such that a scanning signal line is connected to the gate electrode of an active element, and the above-mentioned drain extraction line and interconnection electrode for amendment preferably have a structure not overlapping with the scanning signal line. In this preferred embodiment, the interconnection electrode for amendment does not cross the scanning signal line even after drain/drain interconnection; therefore, the coupling capacity between that electrode and the scanning signal line can be effectively pre-vented from increasing, and the display quality of the subpixel whose defect has been corrected by drain/drain interconnection can be improved.

In the practice of this preferred embodiment of the present invention, the storage capacitor upper electrode is preferably constituted of at least three divided electrodes in the area facing the corresponding storage capacitor lower electrode. In this preferred embodiment, even in case of short circuiting of the storage capacitor upper electrode with the storage capacitor lower electrode facing thereto via an insulating layer as caused by a conductive foreign matter or a pinhole or in case of short circuiting thereof with the data signal line formed in the same step, it is possible to electrically separate only the divided electrode including the site of short circuiting to thereby allow the remaining divided electrodes effectively and allow the storage capacitor element to maintain the function thereof. Further, both end portions of the storage capacitor upper electrode are generally subject to short circuiting because of the disposition of data signal and other lines. Even in case of two divided electrodes on both ends having been involved in short circuiting, it is possible to allow the remaining divided electrode(s) to function effectively by carrying out an isolation treatment separating only the short-circuiting electrode to thereby maintain the function of the storage capacitor element. Therefore, when such an active matrix substrate is used as the pixel electrode substrate in a display device such as a liquid crystal display device, the occurrence of pixel defects in the image displayed caused by short circuiting of the storage capacitor upper electrode can be effectively inhibited.

Another preferred embodiment of the present invention provides a display device equipped with the above active matrix substrate. As a result of the use of the above active matrix substrate as the pixel electrode substrate, such display devices can be manufactured in a high yield while the occurrence of pixel defects in displayed images as caused by drain extraction line breaking is effectively suppressed and the display quality is prevented from lowering. The above display device is preferably a liquid crystal display device, among others. Such liquid crystal display device generally includes a liquid crystal layer sandwiched between the above active matrix substrate and a substrate having a color filter layer formed thereon, and predetermined voltages can be applied to the liquid crystal layer via the active elements.

The active matrix substrate according to a preferred embodiment of the present invention preferably has the constitution described hereinabove, and each drain extraction line preferably has at least two routes and, therefore, the signal from the active element is sent to the storage capacitor upper electrode via at least two conducting routes. As a result, the possibility of the active element and storage capacitor upper electrode being insulated as a result of partial drain extraction line breaking can be reduced. When such active matrix substrate is used as the pixel electrode substrate in a display device such as a liquid crystal display device or EL (electroluminescence) display device, the occurrence of pixel defects in displayed images as resulting from drain extraction line breaking can be effectively suppressed, the display quality of the display device can be inhibited from lowering, and the yield can be improved.

The following examples, which are described referring to the drawings attached hereto, illustrates preferred embodiments of the present invention in further detail. These examples are, however, by no means limitative of the scope of the invention.

First, referring to the liquid crystal display devices described in the examples, the active matrix substrate and color filter substrate are described referring to FIGS. 1-1, 2, 3, 4, 5-1, 6-1 and 7-1.

Figures 1, 2:
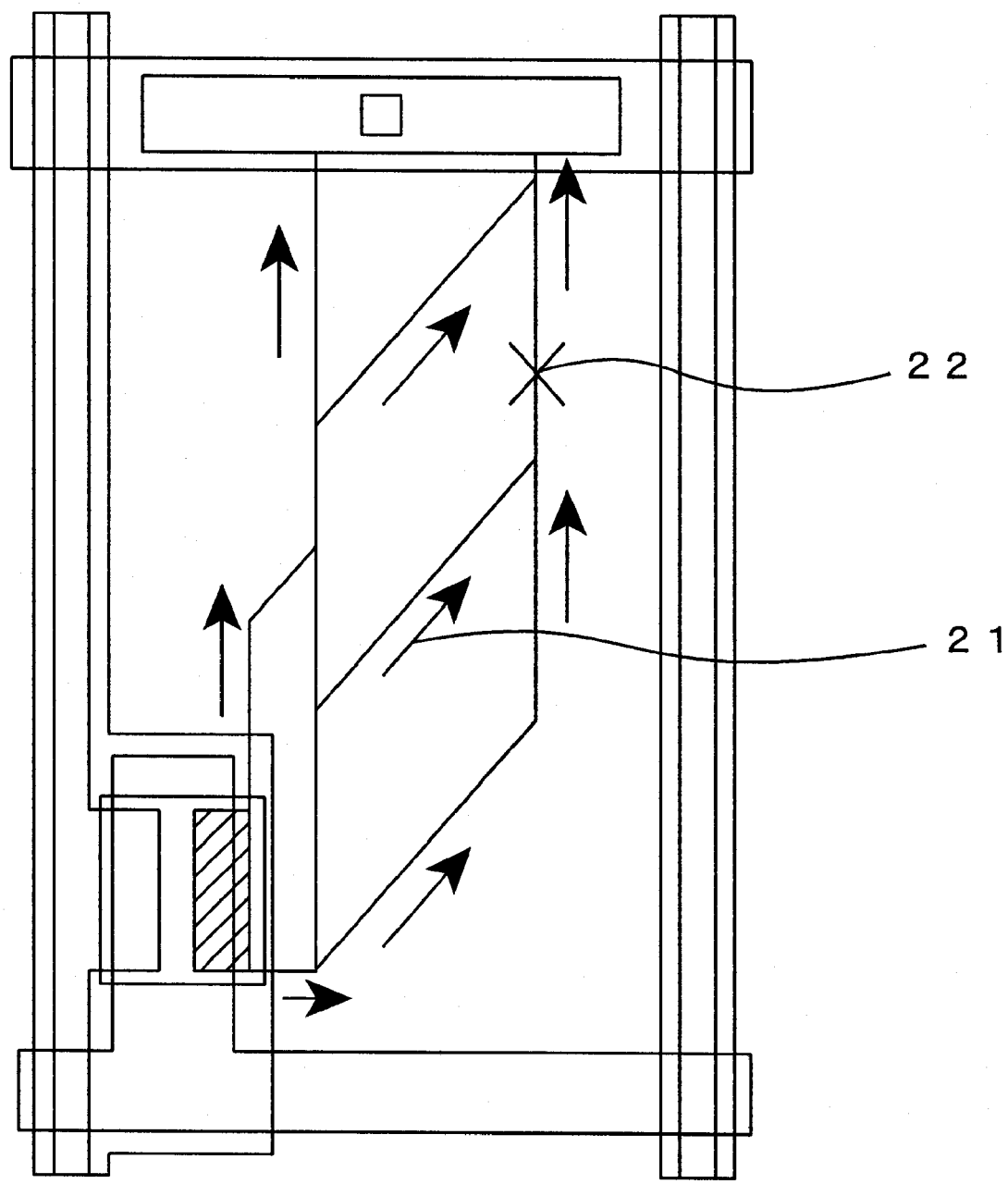
Figure 2:
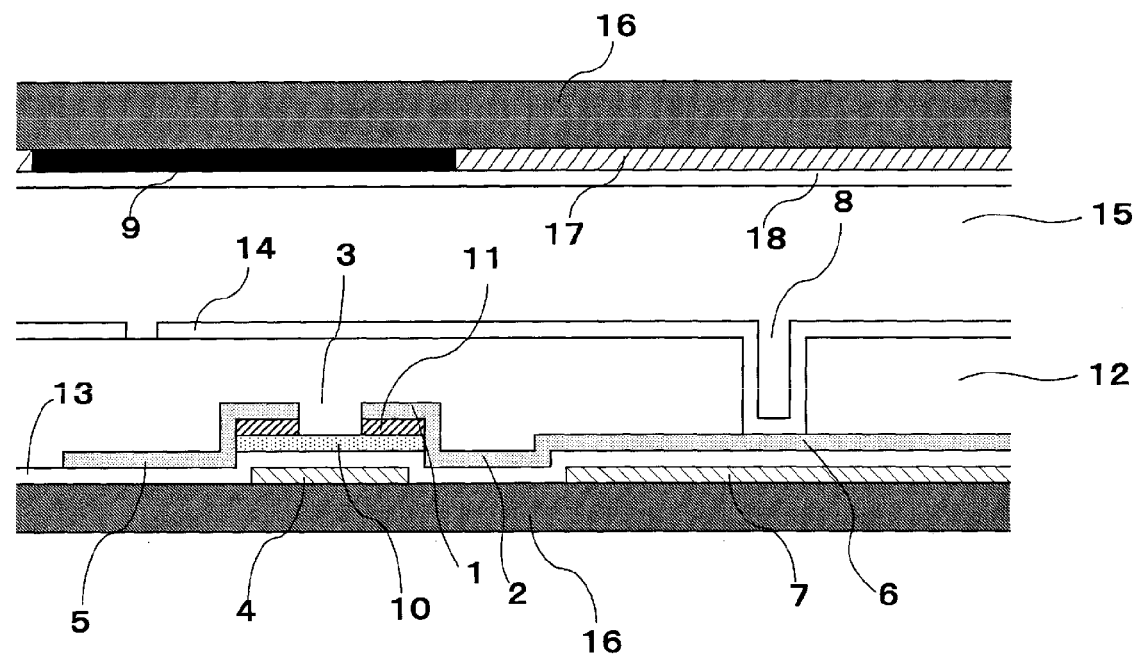
Figure 3:
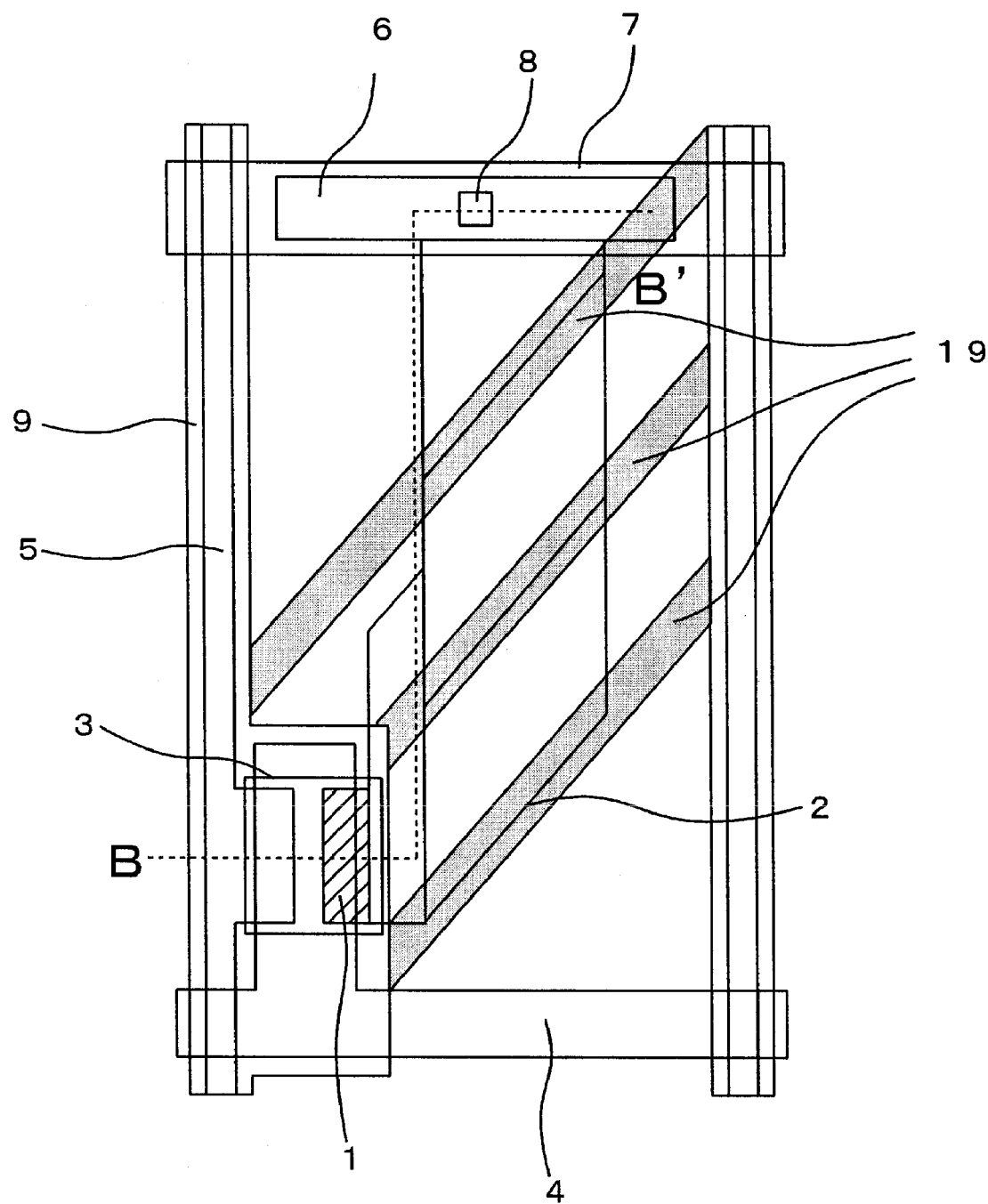
FIG. 3 is a schematic plan view illustrating an example of the branched structure in the active matrix substrate of the invention in which the MVA (multi-domain vertical alignment) system is used.
Figure 4:
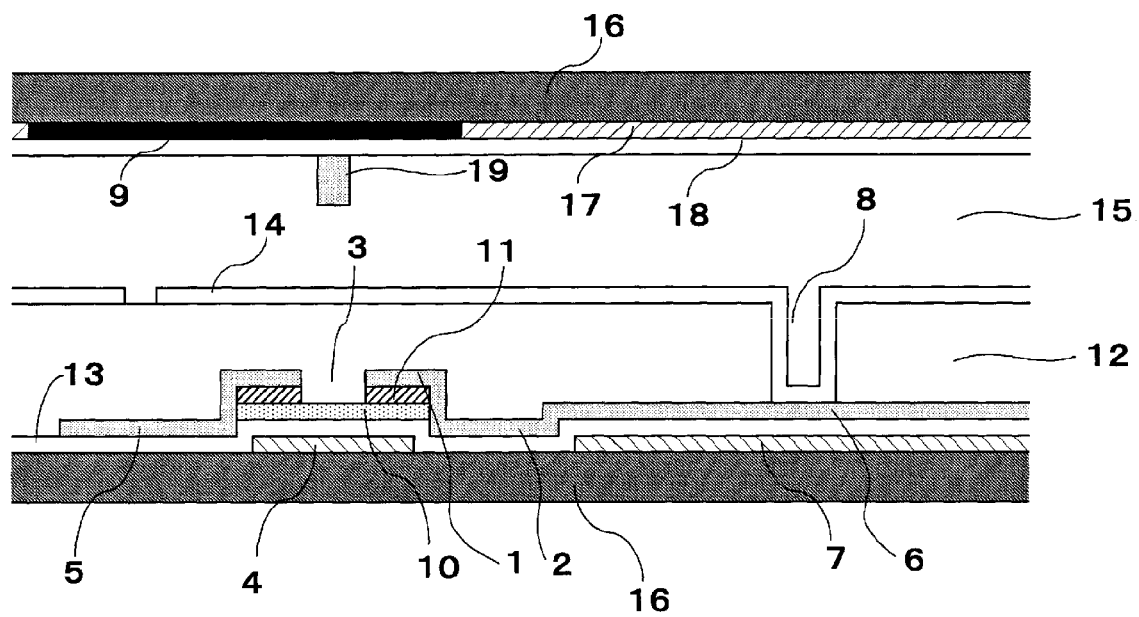
FIG. 4 is a schematic sectional view illustrating the section along the broken line B-B' of the active matrix substrate shown in FIG. 3.

FIG. 1-1 is a schematic plan view illustrating an example of the branched structure in the active matrix substrate according to a preferred embodiment of the present invention, and FIG. 2 is a schematic sectional view illustrating the section along the broken line A-A' of the active matrix substrate shown in FIG. 1-1. FIG. 3 is a schematic plan view illustrating an example of the branched structure in the active matrix substrate according to a preferred embodiment of the present invention in which the MVA system is used, and FIG. 4 is a schematic sectional view illustrating the section along the broken line B-B' of the active matrix substrate shown in FIG. 3. FIGS. 5-1, 6-1 and 7-1 each independently is a schematic plan view illustrating another example of the structure of the drain extraction line 2 in the active matrix substrate according to a preferred embodiment of the present invention.

Structure of the Active Matrix Substrate

As shown in FIGS. 1-1 and 2, one TFT (thin film transistor) element 3 is disposed, as the active element, for each pixel in the active matrix substrate. A gate bus line 4 as a gate line for feeding a gate signal to the TFT element 3 and a source bus line 5 as a source line for feeding a data signal 21 to the TFT element 3 are disposed each perpendicularly to the TFT element 3 in each pixel. There is also formed a rectangular storage capacitor upper electrode 6 on an extension of a drain electrode 1 of the TFT element 3 and a line (drain extraction line) 2 extracted from the drain electrode 1. Below the storage capacitor upper electrode 6, there is formed, independently of the gate bus line 4 and in parallel to the gate bus line 4, a Cs bus line 7 as a storage capacitor line for forming a storage capacitor Cs with the storage capacitor upper electrode 6. Between the storage capacitor upper electrode 6 and Cs bus line 7, there is formed a gate insulator 13. The storage capacitor upper electrode 6 is electrically connected to the drain electrode 1 and overlapping with the Cs bus line 7 via the gate insulator 13 to form a storage capacitor. A contact hole 8 serves to connect a transmission pixel electrode 14 to the storage capacitor upper electrode 6.

Structure of the Color Filter Substrate

In the color filter substrate, a color layer 17 is formed on the surface, facing a liquid crystal layer 15, of a color filter side glass substrate 16, and a counter electrode 18 made of a transparent electrode is formed on the liquid crystal layer 15 side surface of the color layer 17, as shown in FIG. 2. In the case of a liquid crystal display device of the MVA system, an alignment controlling protrusion 19 for controlling the alignment of liquid crystal molecules in the liquid crystal layer 15 is formed on the liquid crystal layer 15 side surface of the counter electrode 18, as shown in FIG. 4. The voltage controlled by the TFT element 3 is applied to the transmission pixel electrode 14 via the contact hole 8 by means of the drain extraction line 2 and drives the liquid crystal layer 15 by the potential difference from the counter electrode 18 in the color filter substrate.

The drain extraction line 2 connected to the storage capacitor upper electrode 6 has two or more routes, as shown in FIG. 1-1. In other words, the drain extraction line 2 is branched into a plurality of lines to form a branch structure. In the case of a liquid crystal display device of the MVA system, the drain extraction line 2 having a branch structure is disposed so as to be located below the alignment controlling protrusion 19, as shown in FIG. 3. In the case of a liquid crystal display device of the MVA system, the drain extraction line 2 in FIG. 5-1, 6-1 or 7-1 is disposed so as to be located below the alignment controlling protrusion 19 in the same manner as shown in FIG. 3.

In FIG. 1-1 and other figures, TFT elements are used as the active elements of the active matrix substrate but this has no limitative meaning. In FIG. 1-1 and other figures, the number of drain extraction lines 2 connected to the storage capacitor upper electrode 6 is two or three. The number is not limited thereto but may be one or more.

Method for Manufacturing the TFT Substrate

Now, referring to FIG. 2, a method for manufacturing the active matrix substrate (TFT substrate) using TFT elements as the active elements is described.

First, using a film of a metal such as titanium, chromium, aluminum or molybdenum or an alloy thereof or a laminate thereof, the gate bus line 4 and Cs bus line 7 are formed on a glass substrate 16, which is an insulator, in one and the same step. Then, on the surfaces of these, a gate insulator 13 made of a silicon nitride, silicon oxide or like insulator layer is formed, followed by formation of a high resistivity semiconductor layer (i layer) 10 of amorphous silicon or polysilicon, for instance, and of a low resistivity semiconductor layer ($n^+$ layer) 11 of impurity-doped $n^+$ amorphous silicon, for instance, and further followed by simultaneous patterning of i/$n^+$ layers. Then, the source bus line 5, drain electrode 1, drain extraction line 2 and storage capacitor upper electrode 6 are formed simultaneously using a film of a metal such as titanium, chromium, aluminum or molybdenum or an alloy thereof or a laminate thereof. On that occasion, the structure of the drain extraction line 2 is patterned in a branch form. Thereafter, the $n^+$ layer 11 on the TFT element 3 is subjected to etching for source/drain separation. In this step, the TFT element 3 formation is completed.

Then, an interlayer insulation film 12 is formed of an acrylic resin, silicon nitride, silicon oxide or the like so as to cover all the surface of the glass substrate 16 processed in such steps as mentioned above. The contact hole 8 is then formed for connecting the transmission pixel electrode 14 to the storage capacitor upper electrode 6 for driving the liquid crystal layer 15 and realizing the connection of the storage capacitor. Thereafter, a transparent electrode (transmission pixel electrode) 14 is formed of a transparent conductive film, such as an ITO (indium tin oxide), IZO (indium zinc oxide), zinc oxide or tin oxide film, followed by patterning for obtaining an independent transmission pixel electrode 14 for each pixel. In this way, the active matrix substrate (TFT substrate) shown in FIG. 2 can be obtained.

Method for Manufacturing the Color Filter Substrate

Referring to FIG. 2 and FIG. 4, a method for manufacturing the color filter substrate is now described.

First, on a glass substrate 16, which is an insulator, there are formed red, green and blue color layers 17 in each area corresponding to the transmission pixel electrode 14 in the TFT substrate using photosensitive resin compositions prepared by dispersing each pigment in an acrylic resin, and a black matrix 9, which is a light-shielding layer, is formed in areas corresponding to the gap between the transmission pixel electrodes 14, source bus line 5 and TFT element 3. The color layers 17 are formed so as to be disposed without overlapping with one another. Then, the counter electrode 18, which is a transparent electrode for driving the liquid crystal layer 15, is formed so as to cover the black matrix 9 and respective color layers 17 utilizing a transparent conductive film, such as an ITO, IZO, zinc oxide or tin oxide film. In the case of a color filter substrate for use in a liquid crystal display device of the MVA system, alignment controlling protrusions 19 are then formed of an inorganic silicon compound, for instance, for the purpose of determining a specified direction of tilting of liquid crystal molecules and of restricting the domain boundary positions.

Method for Manufacturing the Liquid Display Device

First, an alignment layer of a polyimide resin is formed on the TFT substrate and color filter substrate obtained as described above. Then, spacers are sprayed at specified positions on the TFT substrate, a sealing material is applied to pre-determined sites on the color filter substrate, the two substrates are subjected to panel alignment, and the sealing material is cured. Then, the panel obtained is cut to a predetermined size, and the liquid crystal display panel is manufactured by filling with a liquid crystal material, filling port sealing, panel cleaning, annealing treatment, and polarizer sticking. The liquid crystal display device is completed by further equipment with a liquid crystal driving IC, a power source circuit, a backlight, input and output line systems, etc.

EXAMPLE 1

Referring to the active matrix substrate for a liquid crystal display device as obtained in the above manner, the drain extraction line 2 connected to the storage capacitor upper electrode 6 is formed so as to comprise two lines, as shown in FIG. 1-1, on the occasion of forming, in each pixel, the branch structure of the drain extraction line 2 branched into a plurality of lines. In this case, the electrical connection between the drain electrode 1 of the TFT element 3 and the storage capacitor upper electrode 6 can be secured even on the occasion of occurrence of the drain line breaking 22 at one site, as shown in FIG. 1-2.

EXAMPLE 2

Figures 1, 5:
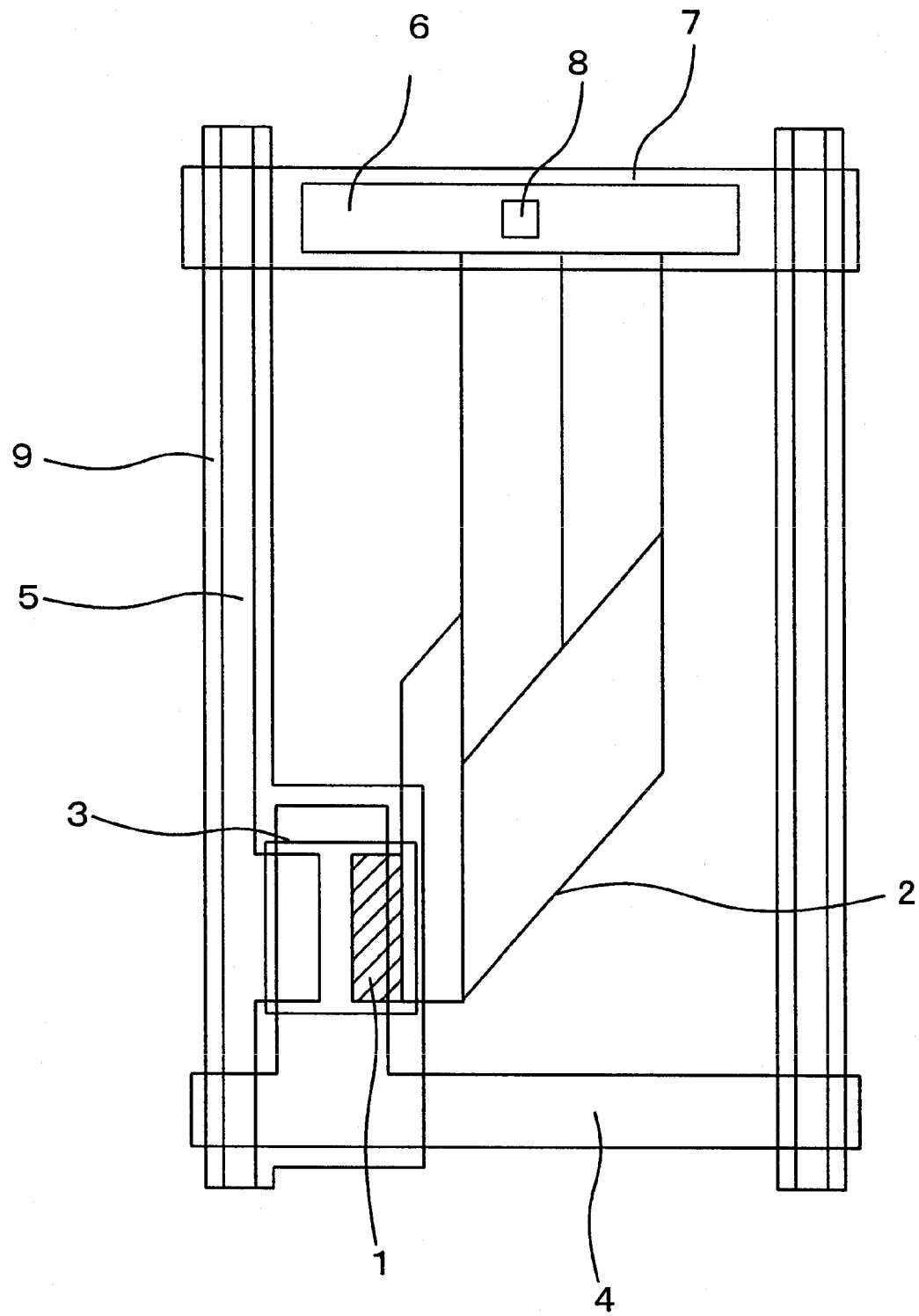
Figures 2, 5:
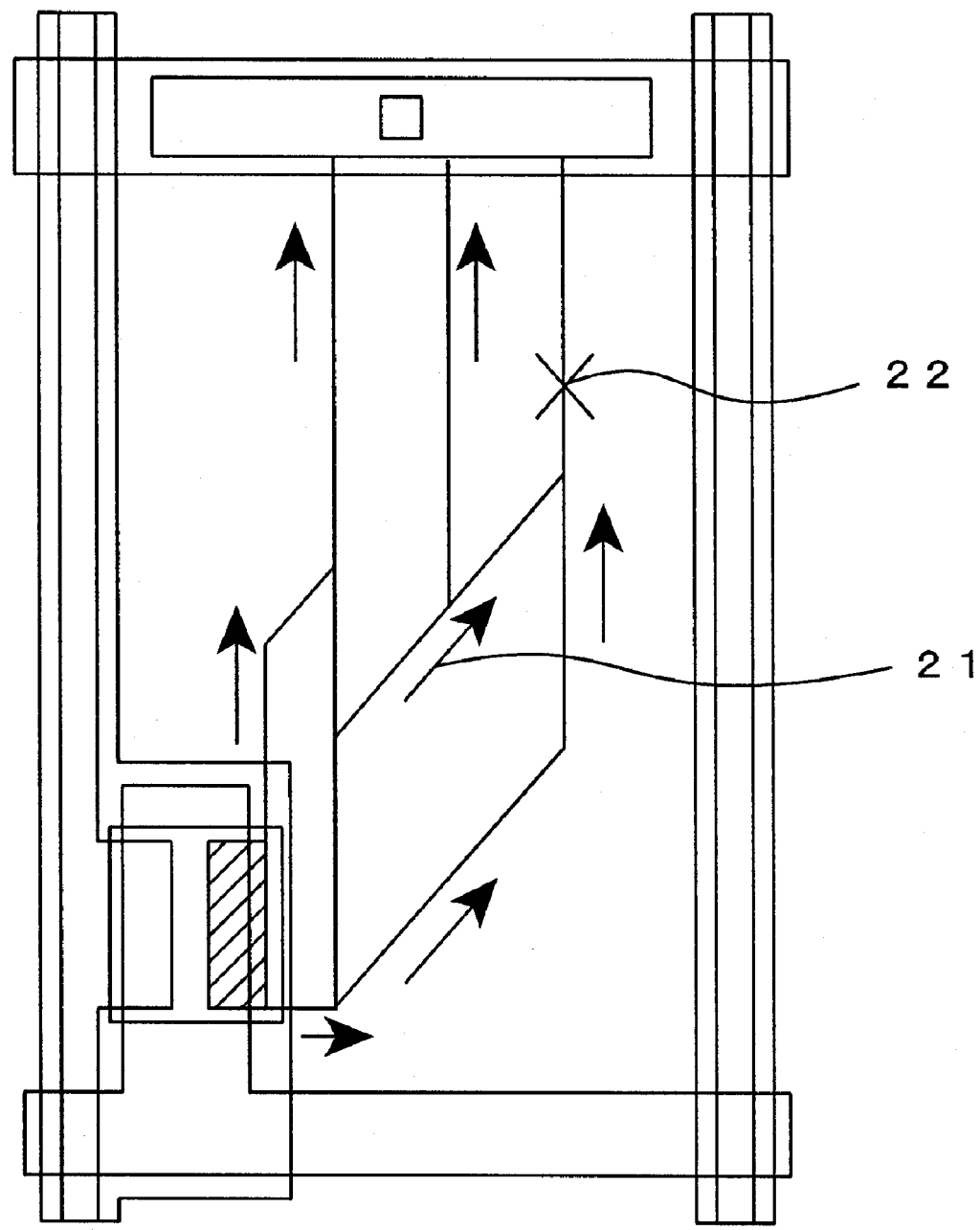

Referring to the active matrix substrate for a liquid crystal display device as obtained in the above manner, the drain extraction line 2 connected to the storage capacitor upper electrode 6 is formed so as to comprise three lines, as shown in FIG. 5-1, on the occasion of forming, in each pixel, the branch structure of the drain extraction line 2 branched into a plurality of lines. In this case, the electrical connection between the drain electrode 1 of the TFT element 3 and the storage capacitor upper electrode 6 can be secured even on the occasion of occurrence of the drain line breaking 22 at one site, as shown in FIG. 5-2.

EXAMPLE 3

Figures 1, 6:
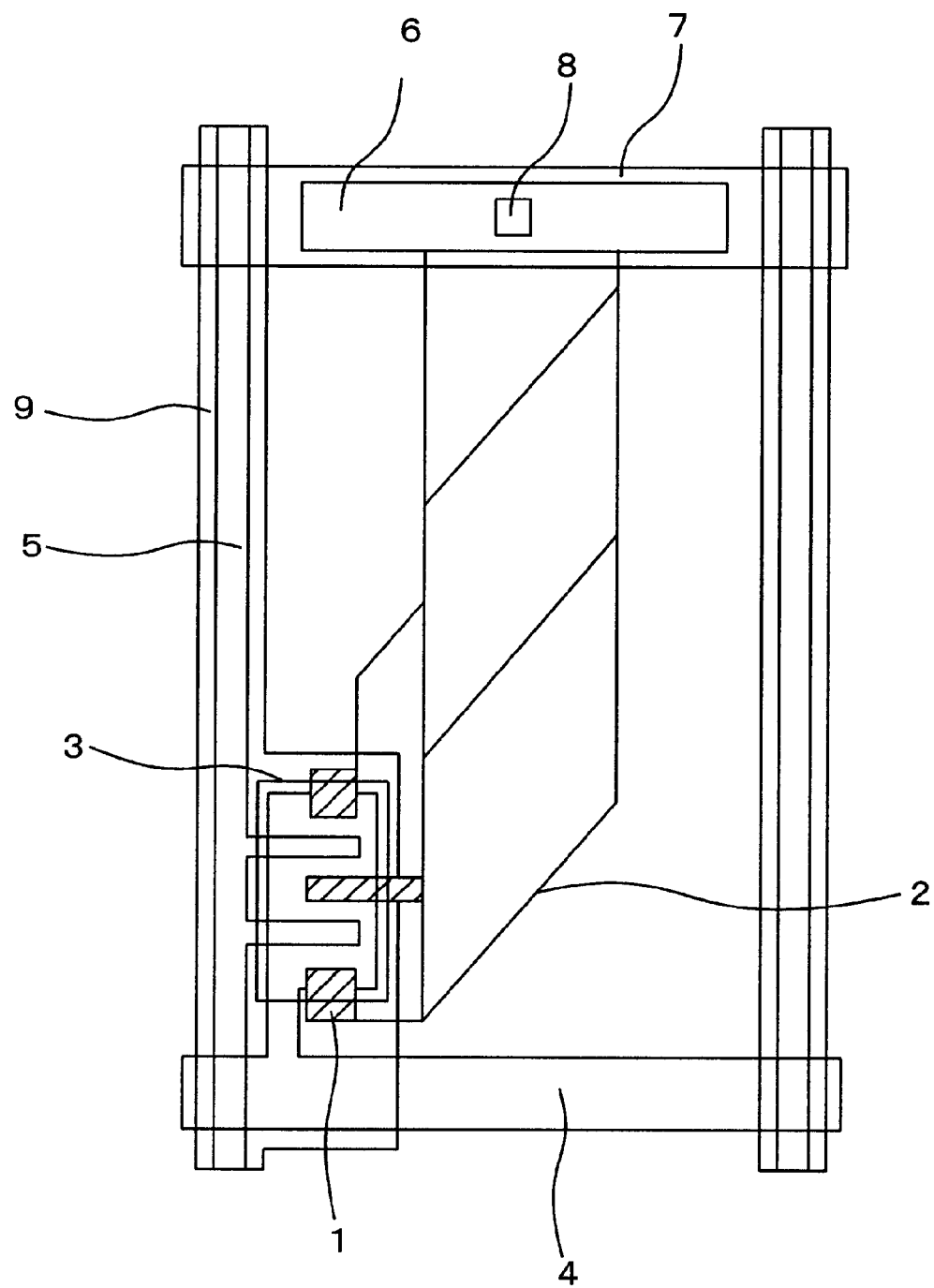
Figures 2, 6:
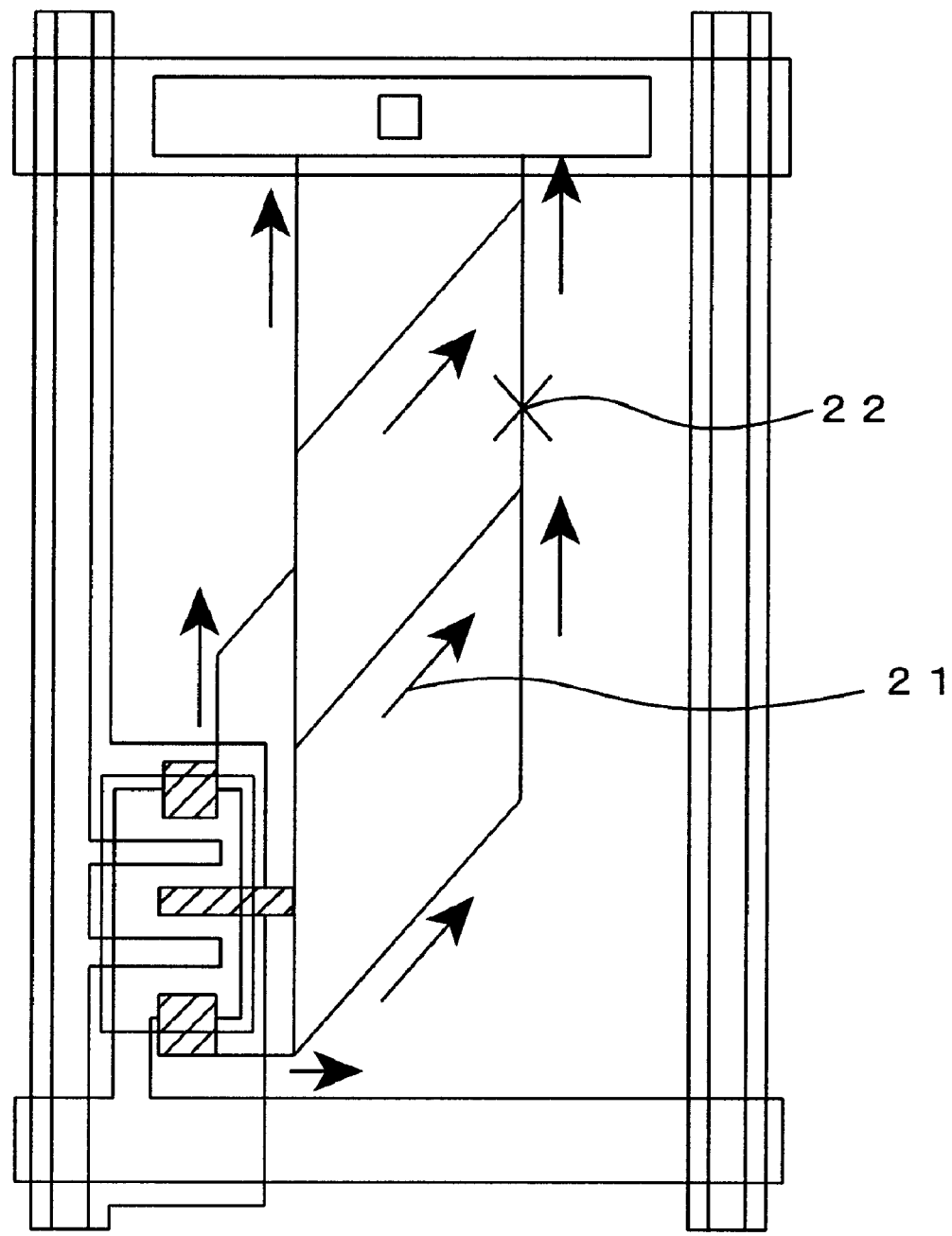

Referring to the active matrix substrate (TFT substrate) for a liquid crystal display device as obtained in the above manner, three drain electrodes 1 are provided to give a redundant structure in preparation for deviations and errors in finish and the drain extraction lines 2 in each pixel area are all branched into a plurality to give a branch structure such that each drain electrode 1 is connected to the storage capacitor upper electrode 6 via at least two routes, as shown in FIG. 6-1, so that the lowering in display quality as caused by parasitic capacitances Cgd may be prevented.

In this case, the electrical connection between the drain electrode 1 of the TFT element 3 and the storage capacitor upper electrode 6 can be secured even on the occasion of occurrence of the drain extraction line breaking 22 at one site, as shown in FIG. 6-2.

EXAMPLE 3

Figures 1, 7:
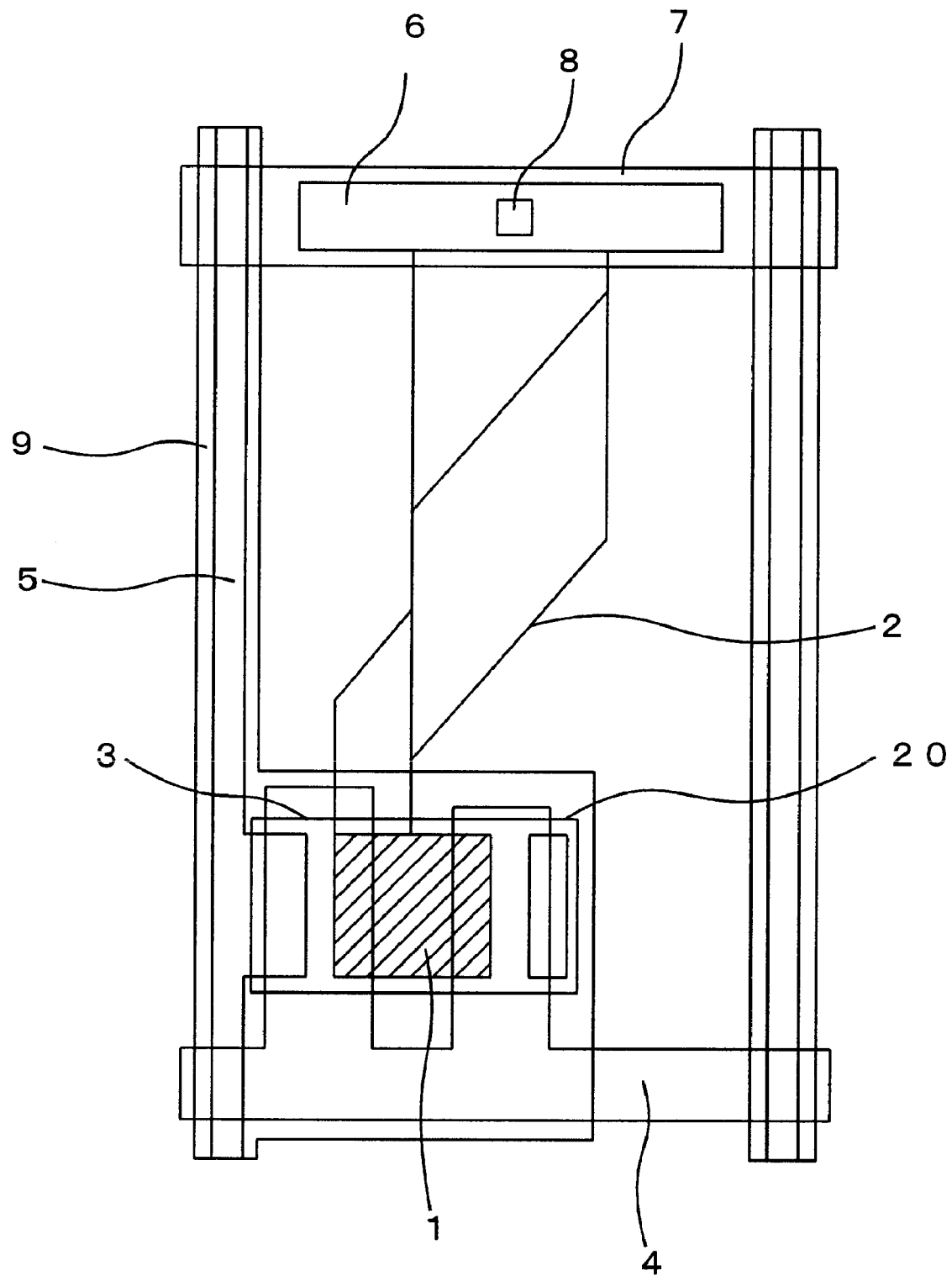
Figures 2, 7:
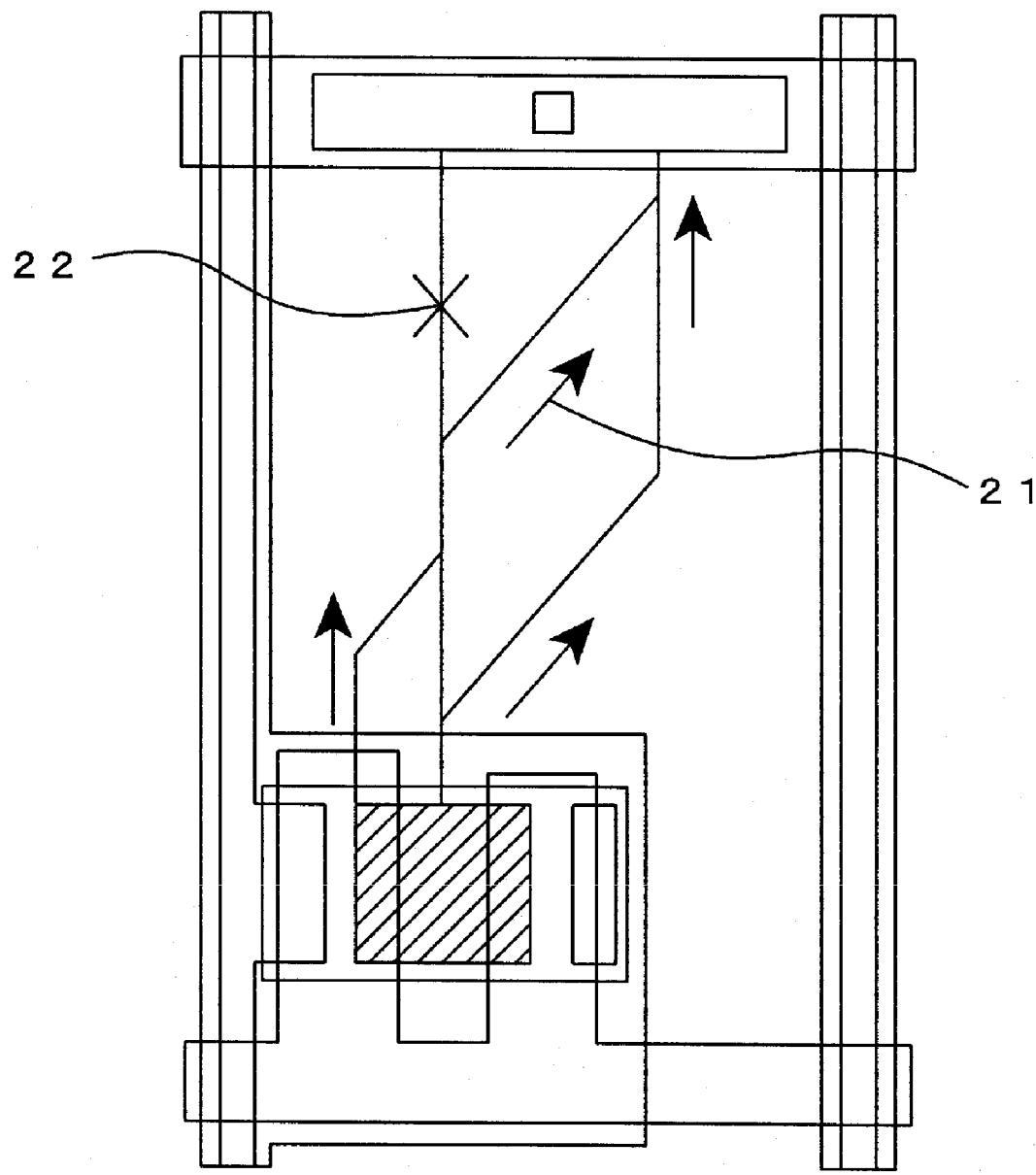

Referring to the active matrix substrate (TFT substrate) for a liquid crystal display device as obtained in the above manner, a dummy TFT element 20 is employed to give a redundant structure in preparation for deviations and errors in finish and the drain extraction lines 2 in each pixel area are all branched into a plurality to give a branch structure such that each drain electrode 1 is connected to the storage capacitor upper electrode 6 via at least two routes, as shown in FIG. 7-1, so that the lowering in display quality as caused by parasitic capacitances Cgd may be prevented.

In this case, the electrical connection between the drain electrode 1 of the TFT element 3 and the storage capacitor upper electrode 6 can be secured even on the occasion of occurrence of the drain line breaking 22 at one site, as shown in FIG. 7-2.

EXAMPLE 5

Figure 8:
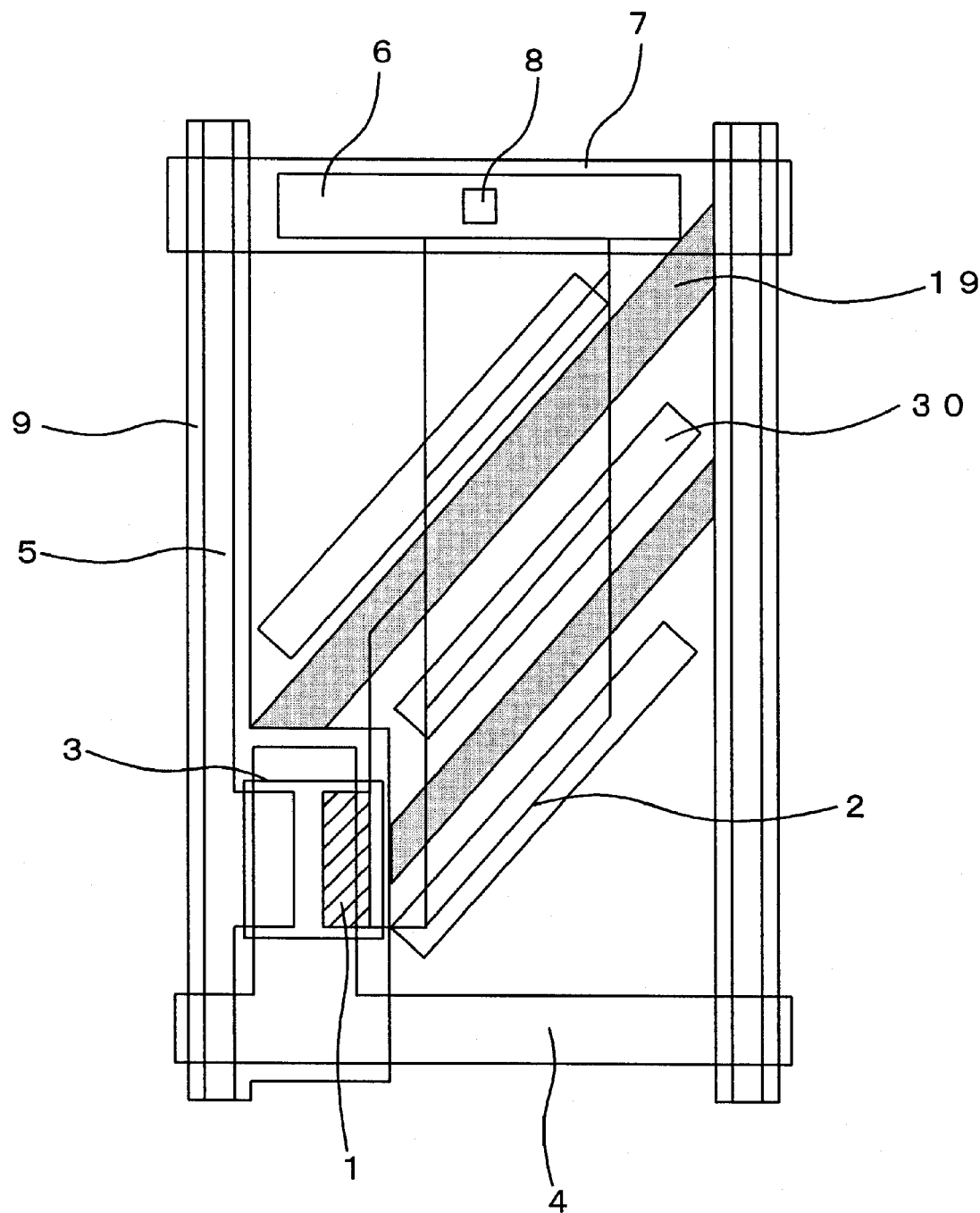
FIG. 8 is a schematic plan view illustrating an example of the branched structure in the active matrix substrate of the invention in which drain extraction lines or routes 2 are disposed each below a slit provided in each pixel electrode.

Referring to the active matrix substrate (TFT substrate) for a liquid crystal display device as obtained in the above manner, the drain extraction line 2 is disposed each below a slit 30 prepared in each pixel electrode and the drain extraction line 2 in each pixel area is branched into a plurality to give a branch structure such that the drain electrode 1 is connected to the storage capacitor upper electrode 6 via at least two routes, as shown in FIG. 8.

In this case, the electrical connection between the drain electrode 1 of the TFT element 3 and the storage capacitor upper electrode 6 can be secured even on the occasion of occurrence of the drain line breaking 22 at one site. It is further possible to give a branch structure to the drain extraction line 2 without lowering the aperture ratio of the liquid crystal display device.

EXAMPLE 6

Figure 9:
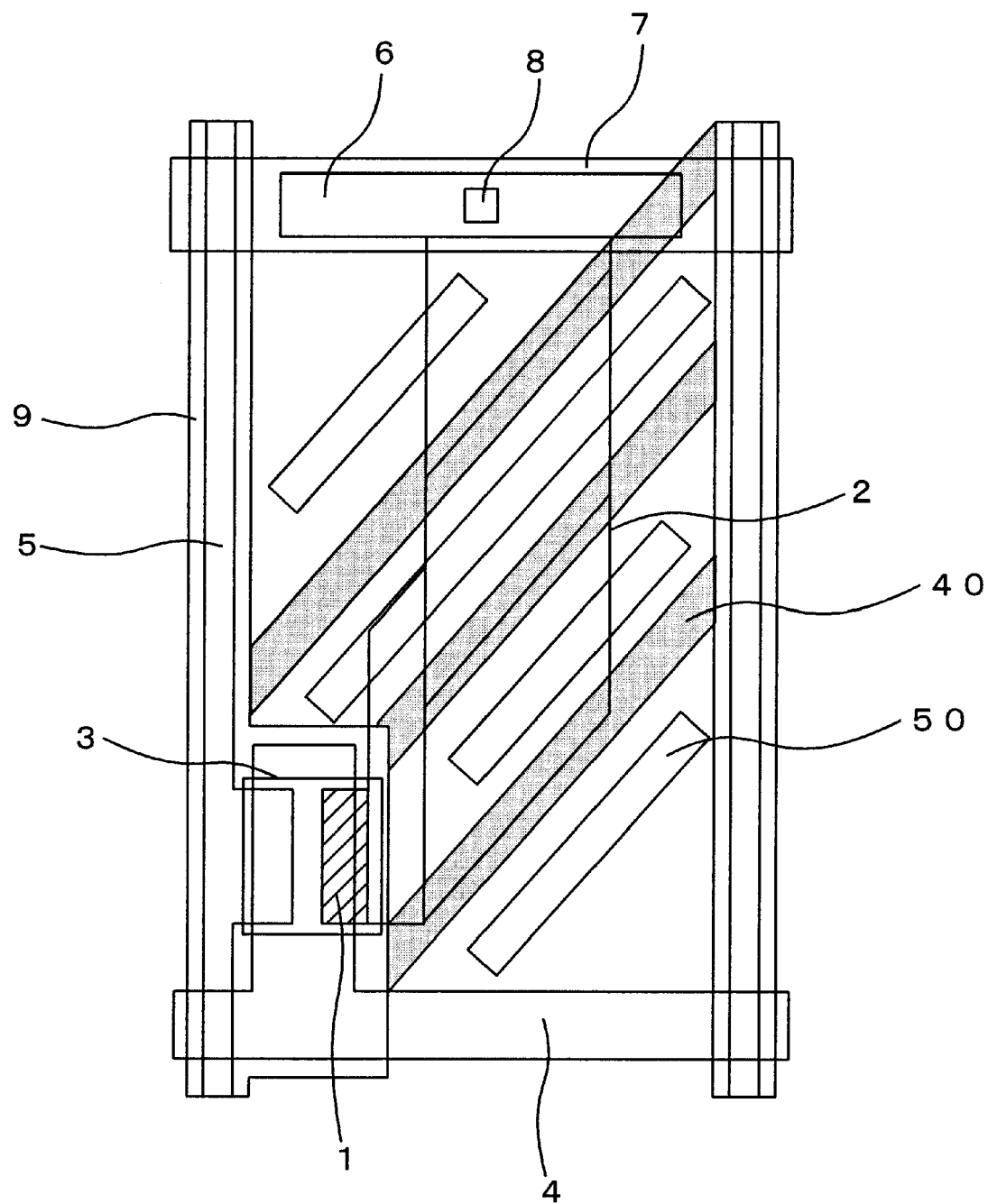
FIG. 9 is a schematic plan view illustrating an example of the branched structure in the active matrix substrate according to a preferred embodiment of the present invention in which drain extraction lines or routes 2 are disposed at those sites which are opposite to slits provided in each opposing electrode of a color filter substrate.

Referring to the active matrix substrate (TFT substrate) for a liquid crystal display device as obtained in the above manner, the drain extraction line 2 is disposed at sites opposing slits 40 prepared on the counter electrode of the color filter substrate and the drain extraction line 2 in each pixel area is branched into a plurality to give a branch structure such that the drain electrode 1 is connected to the storage capacitor upper electrode 6 via at least two routes, as shown in FIG. 9.

In this case, the electrical connection between the drain electrode 1 of the TFT element 3 and the storage capacitor upper electrode 6 can be secured even on the occasion of occurrence of the drain line breaking 22 at one site. It is further possible to give a branch structure to the drain extraction line 2 without lowering the aperture ratio of the liquid crystal display device.

EXAMPLES 7-9

Figure 10A:
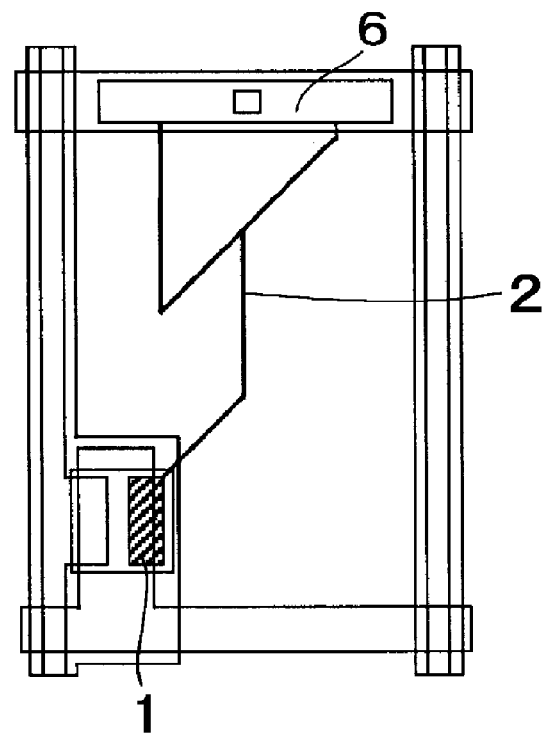
FIGS. 10A to 10F each is a schematic plan view illustrating an example of the branched structure in the active matrix substrate according to a preferred embodiment of the present invention.
Figure 10B:
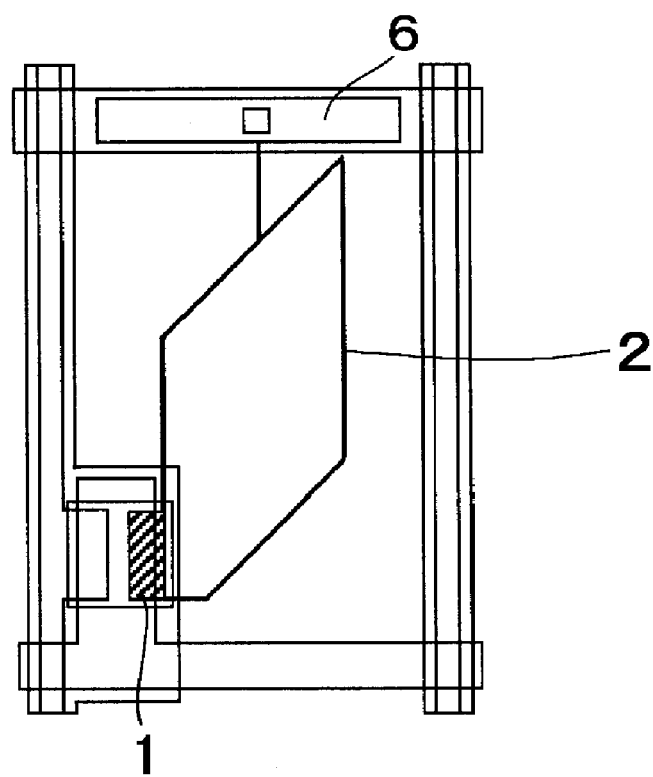
Figure 10C:
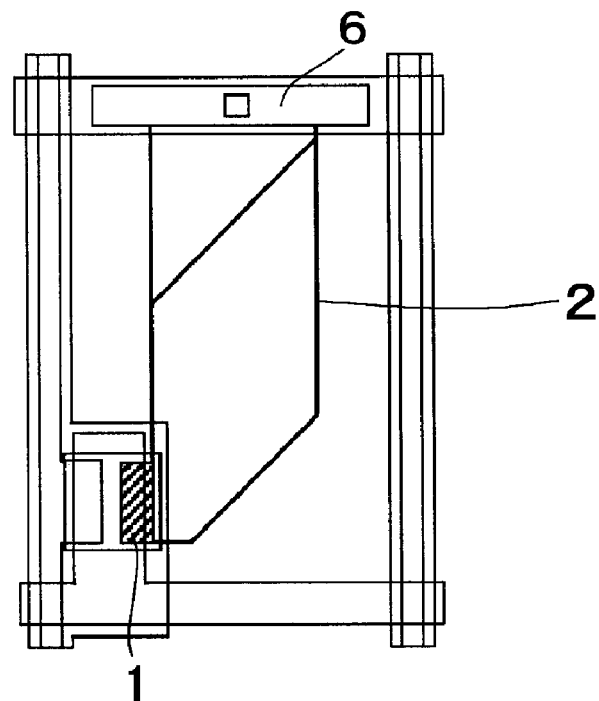

Referring to the active matrix substrate (TFT substrate) for a liquid crystal display device as obtained in the above manner, a branch structure is formed in a manner such that the drain electrode 1 is finally connected to the storage capacitor upper electrode 6 via one or two drain extraction lines 2, as shown in FIGS. 10A, 10B and 10C.

In these cases, the possibility of line breaking between the drain electrode 1 of the TFT element 3 and the storage capacitor upper electrode 6 upon drain line breaking in the drain extraction line 2 can be reduced.

EXAMPLES 10-12

Figure 10D:
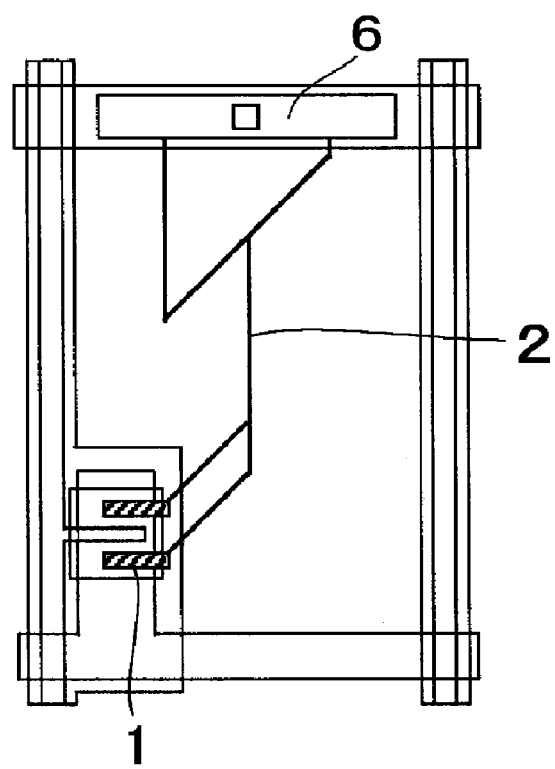
Figure 10E:
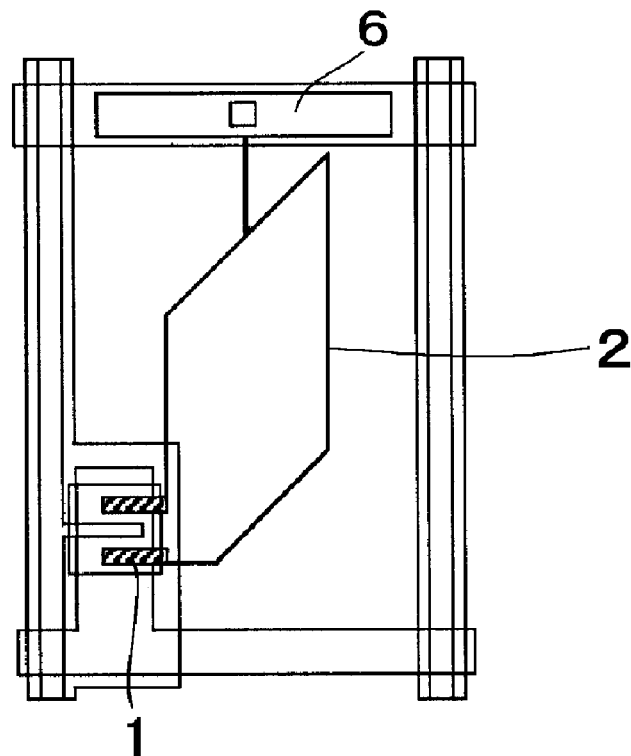
Figure 10F:
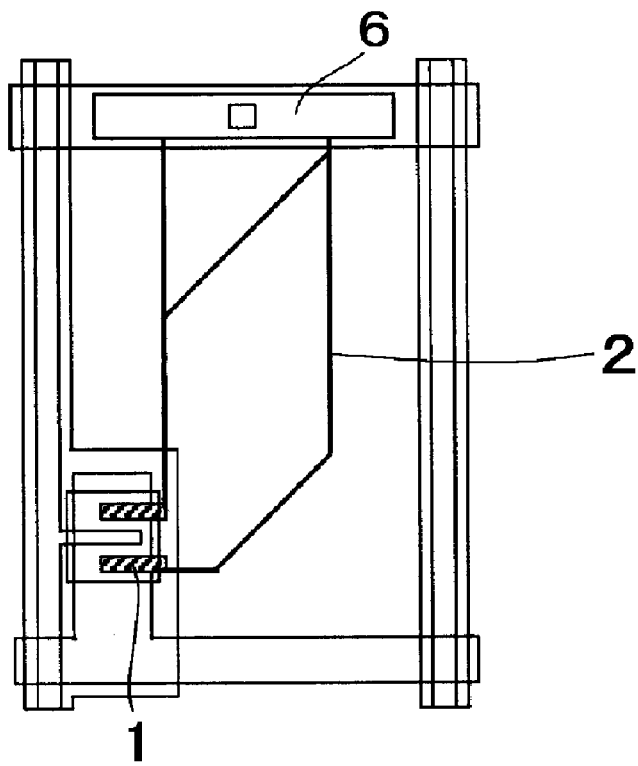

Referring to the active matrix substrate (TFT substrate) for a liquid crystal display device as obtained in the above manner, two drain electrodes 1 are provided and a branch structure is formed in a manner such that the drain electrodes 1 are finally connected to the storage capacitor upper electrode 6 via one or two drain extraction lines 2, as shown in FIGS. 10D, 10E and 10F.

In these cases, the possibility of line breaking between the drain electrode 1 of the TFT element 3 and the storage capacitor upper electrode 6 upon drain line breaking in the drain extraction line 2 can be reduced.

EXAMPLE 13

Figures 1, 11:
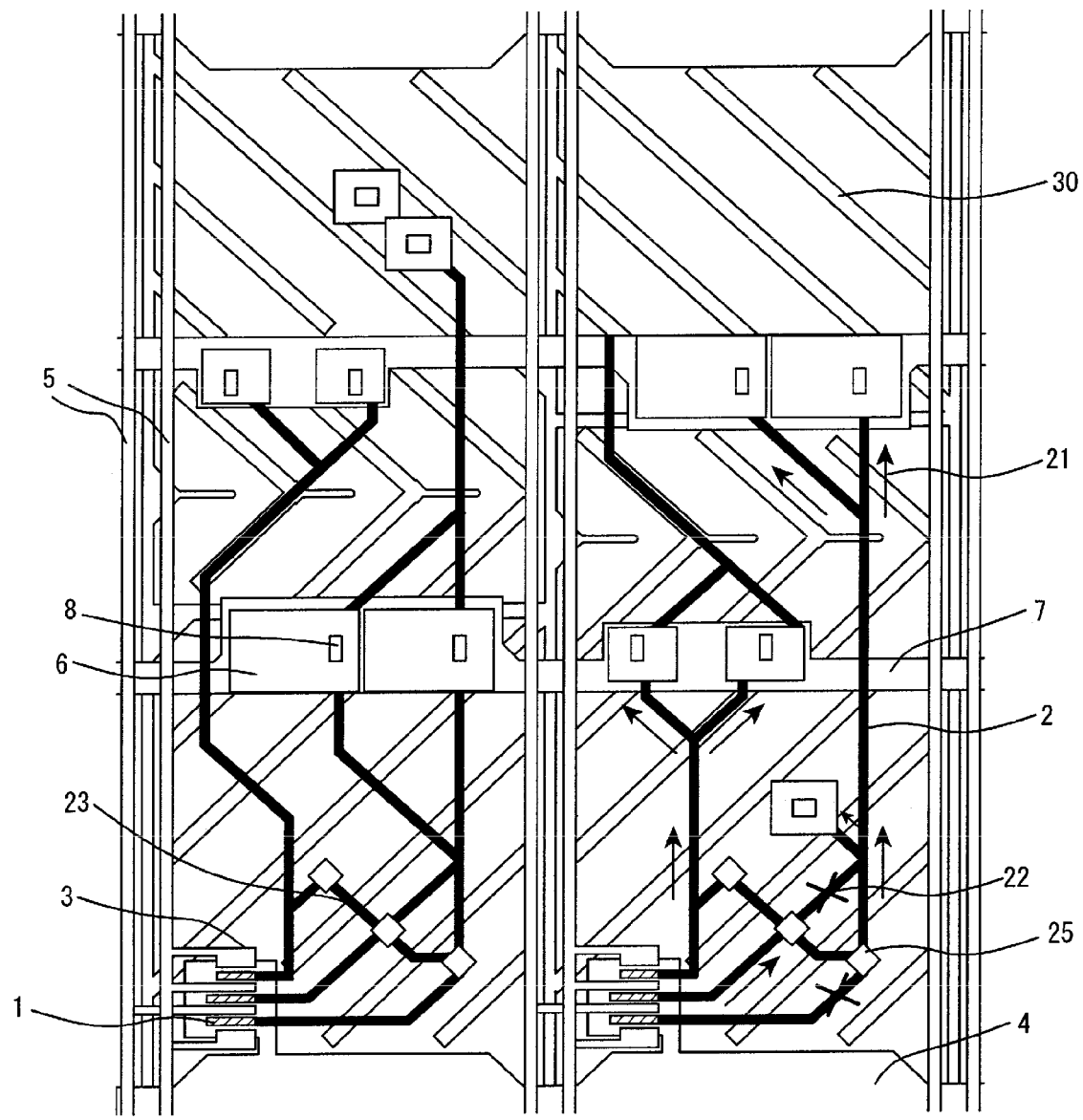

Referring to the active matrix substrate (TFT substrate) for a liquid crystal display device as obtained in the above manner, each TFT element 3 is provided with three drain electrodes 1 and a drain extraction line 2 is formed in a manner such that each of the drain electrodes 1 is connected to the storage capacitor upper electrode 6 on the Cs bus line 7, as shown in FIG. 11-1. The active matrix substrate of this example has three subpixels per pixel and, in each defect-free pixel, the subpixels are driven separately by respective individual drain electrodes. The storage capacitor upper electrode 6 comprises two divided electrodes in the area facing the corresponding storage capacitor lower electrode 7, so that the drain extraction line 2 is formed to show a branch structure in front of the region for connection to the storage capacitor upper electrode 6.

Figures 2A, 11:
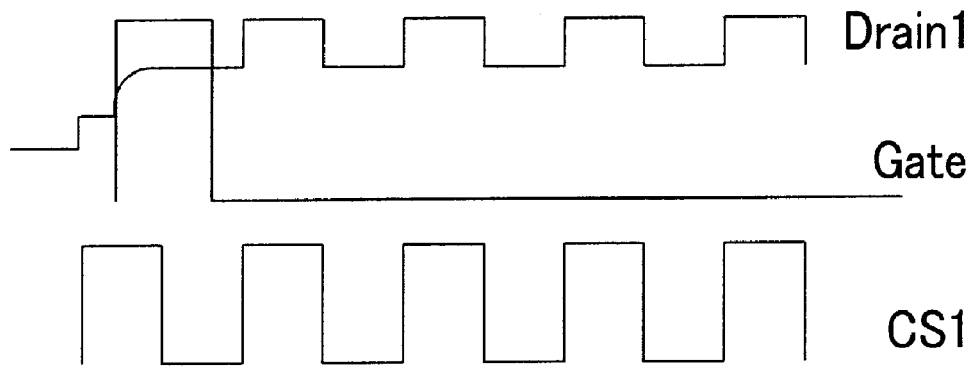
Figures 2B, 11:
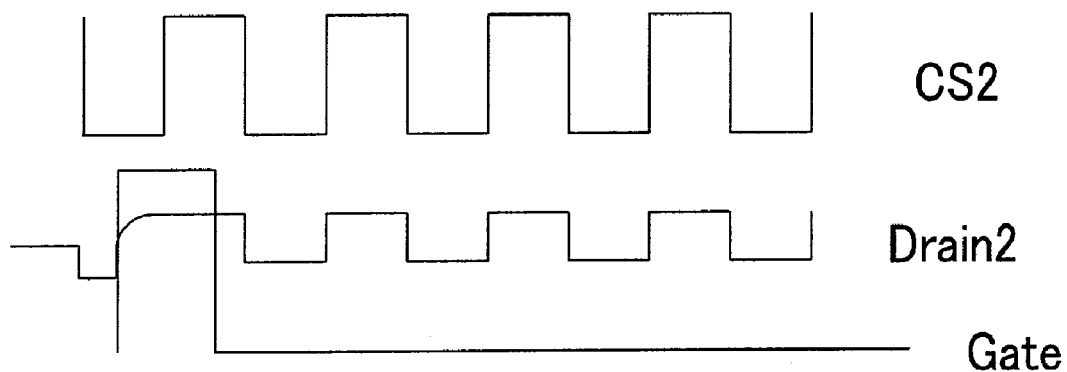

In the neighboring Cs bus lines 7, the Cs signals are opposite in phase, as shown in FIGS. 11-2A and 11-2B, and the waveforms of the Cs signals (CS1 and CS2) differ in polarity, so that the drain signals (Drain1 and Drain2) applied differ in waveform. Therefore, from the pixel gray-scale level viewpoint as well, the neighboring subpixels differ in voltage-transmittance (V-T) characteristics as shown in FIG. 11-3, and the Drain 1 side one corresponding to plus writing (the side increasing the voltage amplitude value) serves as a bright subpixel and the Drain 2 side one corresponding to minus writing (the side decreasing the voltage amplitude value) serves as a dark subpixel. In this example, the area proportion between a bright subpixel corresponding to Drain 1, always serving as the "bright" side and being disposed in the middle of the pixel, and a dark subpixel corresponding to Drain 2, always serving as the "dark" side and being disposed on each end portion of the pixel, is 1:3.

Figures 2C, 11:
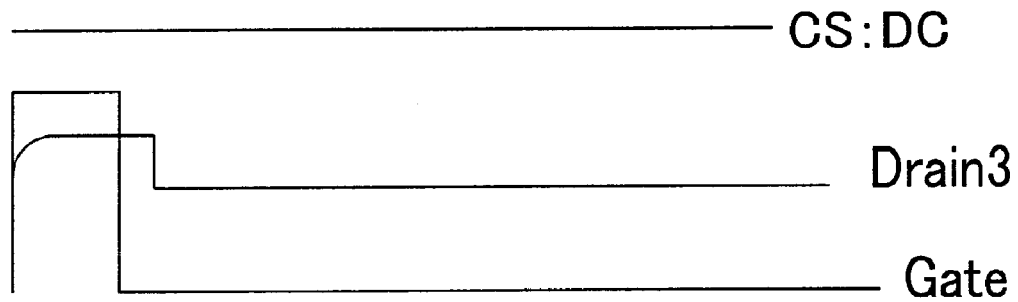
Figures 3, 11:
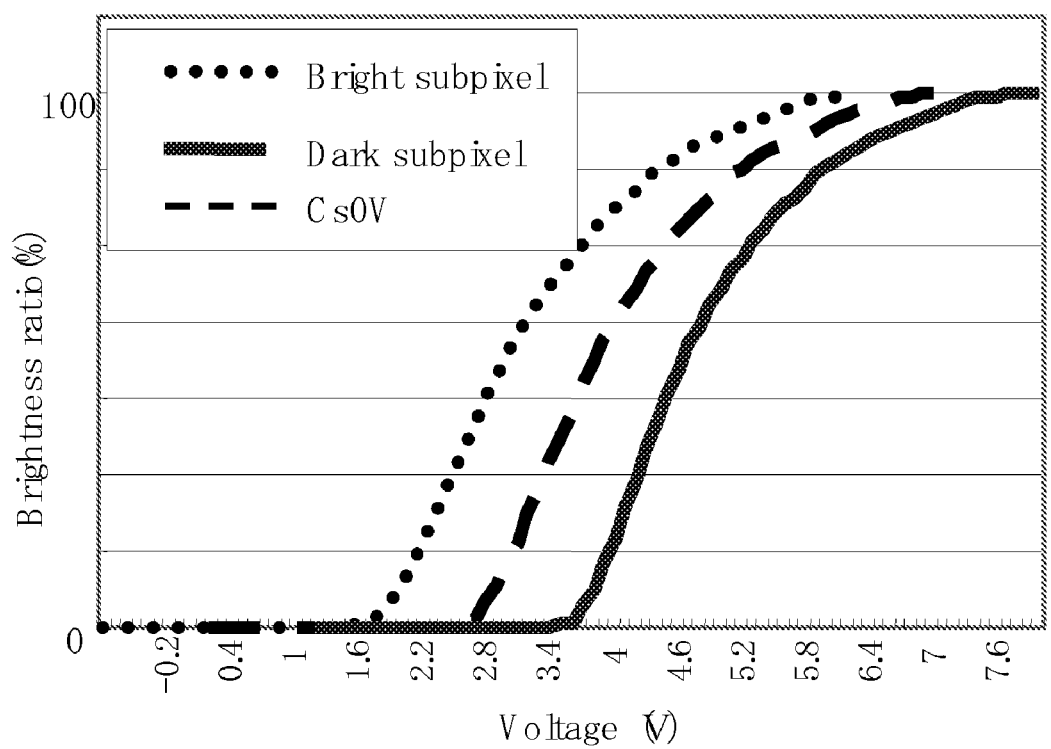
Figures 4A, 11:
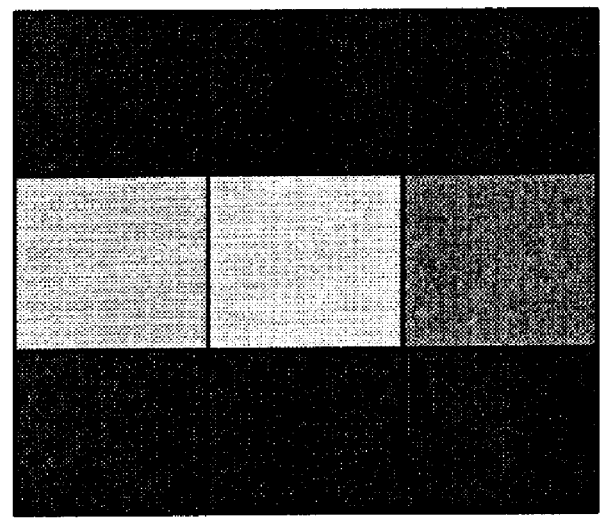
Figures 4B, 11:
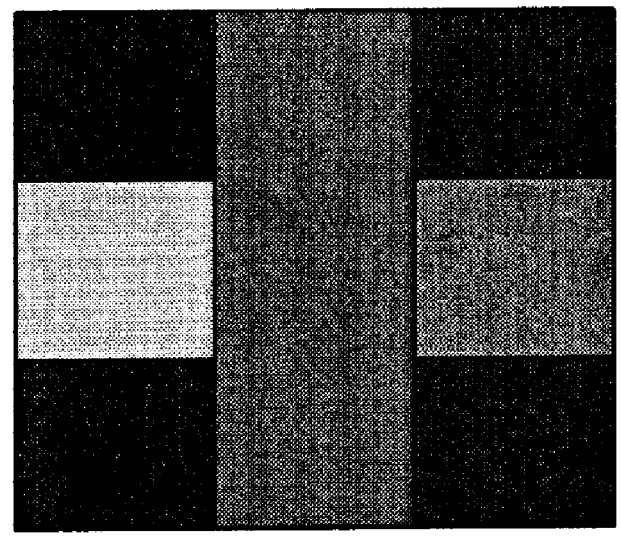

In this case, if there is found drain line breaking 22 in a drain extraction line 2, as shown in FIG. 11-1 and at least one of the plurality of channels is normal, the overlapping portion 25 between a floating island electrode (interconnection electrode for amendment) 23 and the drain extraction line is laser-melted for interconnection of the drain extraction lines 2 of the respective subpixels with each other (drain/drain interconnection) to thereby attain equalization in electric potential. On that occasion, the drain/drain interconnected lines, the waveforms (polarities) of the Cs signals are synthesized so as to negate each other, so that such a Cs signal (CS:DC) with a direct current potential as shown in FIG. 11-2C is applied. As for the V-T characteristics, the V-T curves of both subpixels are synthesized and a V-T curve (CS0V; basic V-T curve) intermediate between that for the bright subpixel and that for the dark subpixel is obtained. Therefore, in this example, even after drain/drain interconnection, V-T characteristics with an intermediate gray scale, which are visually the same as those of a normal pixel without drain/drain interconnection, can be obtained (the human eye cannot recognize the difference in gray scale between both), as seen in the gray-scale image shown in FIG. 11-4B, and all the subpixels (one pixel) can be driven like a normal pixel.

Furthermore, according to this example, unlike the case of drain/drain interconnection utilizing the ladder structure of the source bus line 5, no extra increase in coupling capacity (e.g. Csd) will result and, therefore, defect-free amendment (correction of all defects) can be realized while suppressing the variation of the effective voltage applied to the liquid crystal layer.

Even in case of occurrence of a short circuit (SD leak) between the source bus line 5 (or source electrode) and drain extraction line 2 (or drain electrode 1) in the vicinity of a channel, the channel and drain extraction line 2 involved in leak failure can be electrically separated from each other and the thus-separated drain extraction line 2 can be connected to the drain extraction line 2 from a normal channel for defect correction.

EXAMPLE 14

Figures 1, 12:
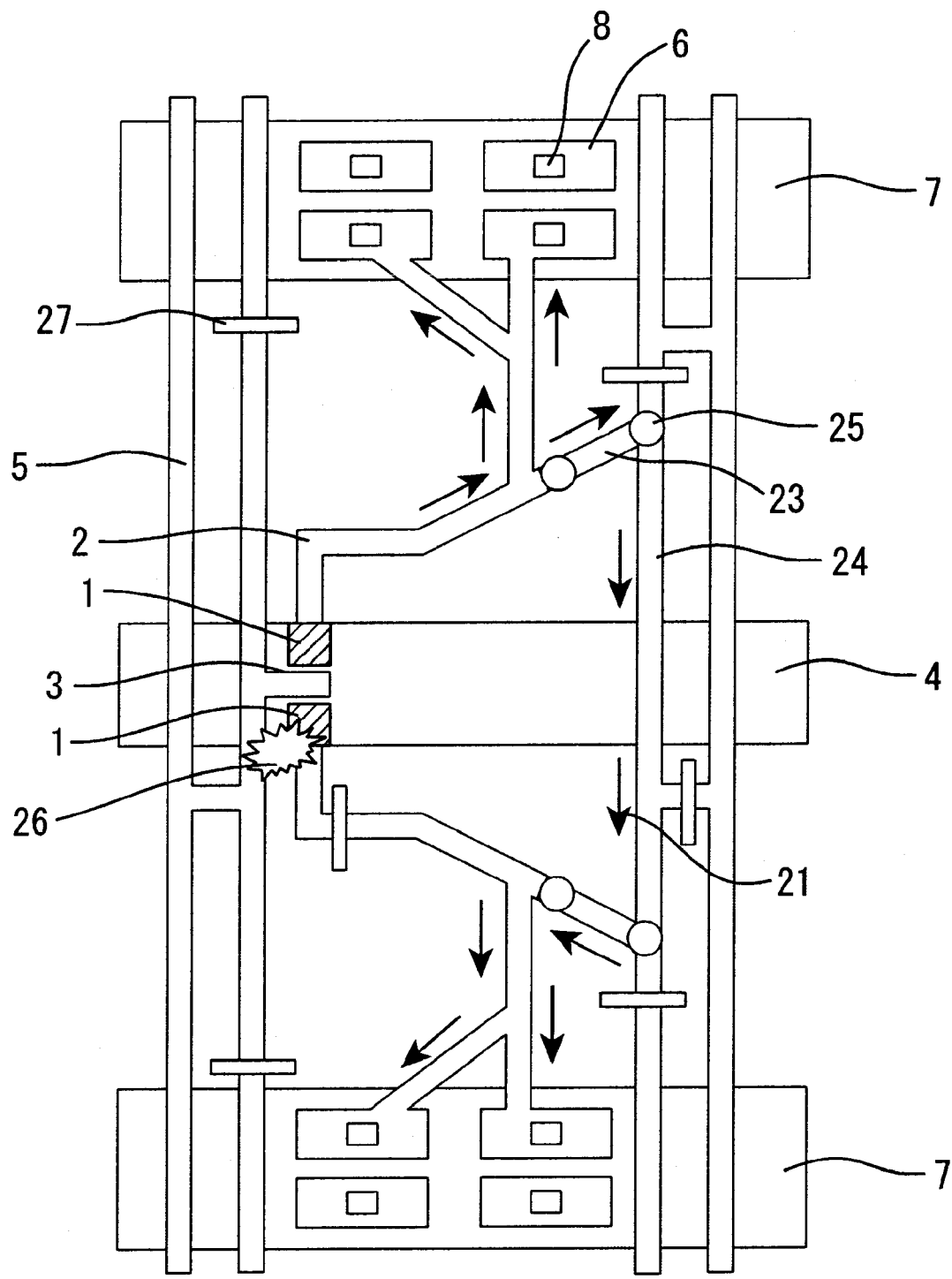
Figures 2A, 12:
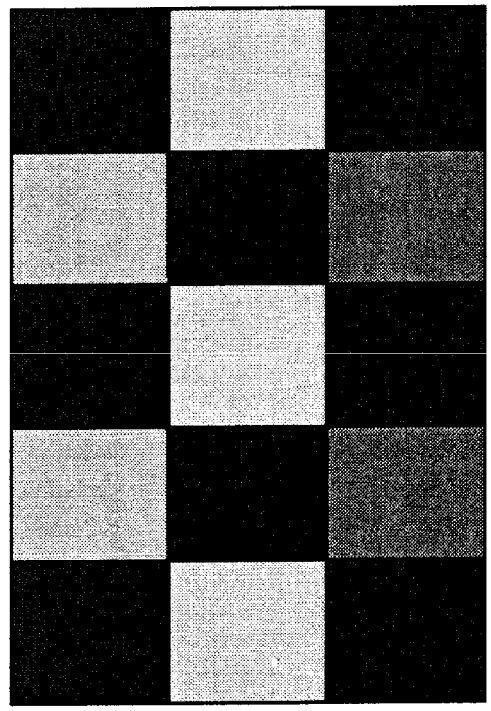
Figures 2B, 12:
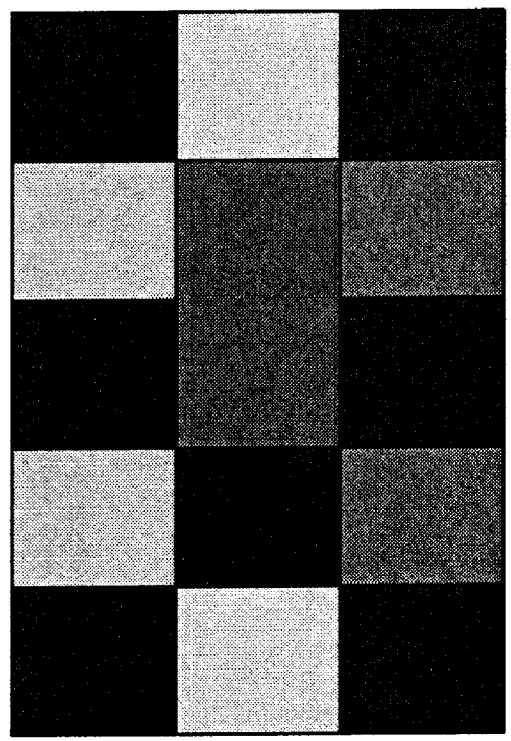
Figures 1, 13:
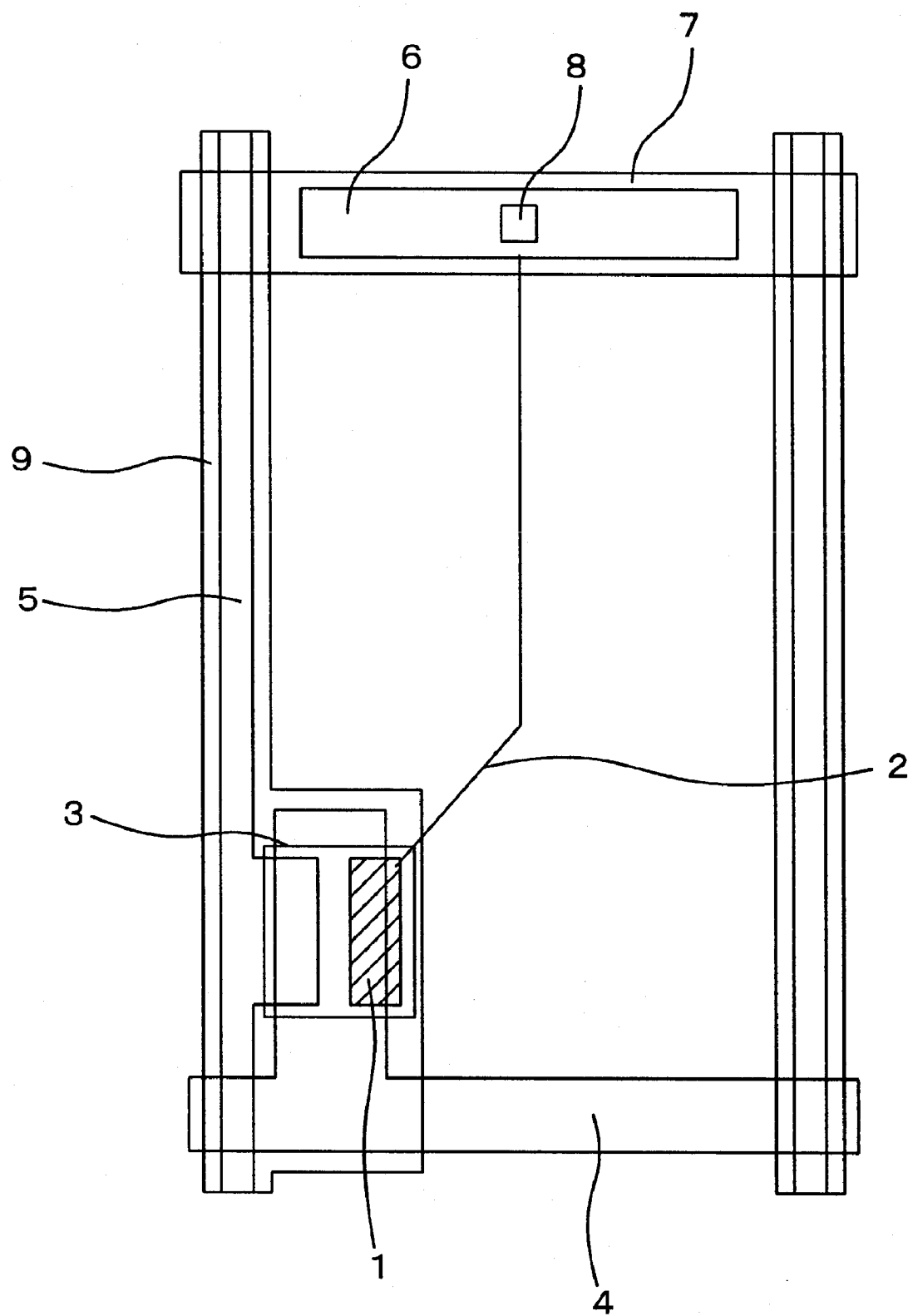
Figures 2, 13:
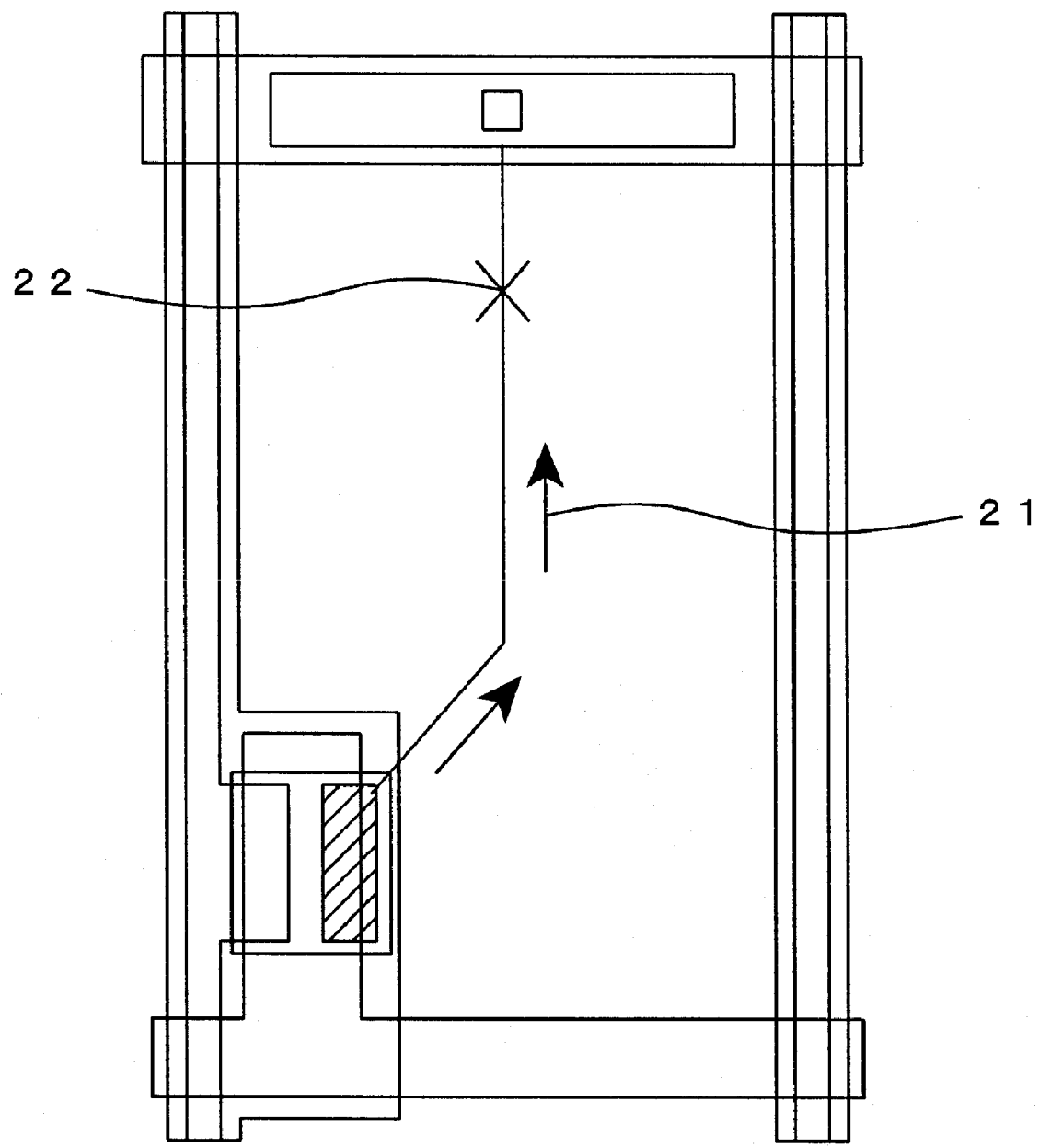

Referring to the active matrix substrate (TFT substrate) for a liquid crystal display device as obtained in the above manner, two drain electrodes 1 are disposed for each TFT element 3, and a drain extraction line 2 is formed so that each drain electrode 1 is connected to the storage capacitor upper electrode 6 on the Cs bus line 7, as shown in FIG. 12-1. In an area facing the storage capacitor lower electrode 7, the storage capacitor upper electrode 6 comprises two electrode divisions and, therefore, the drain extraction line 2 is formed so that it shows a branch structure in front of the section for connection to the storage capacitor upper electrode 6. In the neighboring Cs bus lines 7, the Cs signals are opposite in phase.

In this example, the bright and dark subpixels are disposed in an area proportion of 1:1.

In this case, on the occasion of occurrence of an SD leak, as shown in FIG. 12-1, the drain extraction lines 2 are connected to each other (drain/drain interconnection) using a floating island pattern electrode 23 and a source ladder 24 cut off from the source bus line 5 after cleavage at a cleavage site 27.

In this way, the same effects as in Example 13 can be obtained. Thus, as shown in the gray-scale images in FIGS. 12-2A and 12-2B, V-T characteristics with an intermediate gray scale which, to the human eye, appears the same as the gray scale of a normal pixel without drain/drain interconnection are obtained. In this example, however, there is an area where the source ladder 24 interconnecting both the drain extraction lines to each other is partly overlapping with a gate bus line 4, and this results in an increase in coupling capacity and a difference in capacity with the neighboring pixels. Therefore, the effective voltage value (voltage applied to the liquid crystal layer) varies to some extent as compared with the amendment method of Example 13 shown in FIG. 11-1.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An active matrix substrate comprising:
   a pixel including:
      a plurality of subpixels;
      a plurality of drain extraction lines;
      a plurality of drain electrodes, each of the plurality of drain electrodes is connected to at least one of the plurality of drain extraction lines; and
      a conductive portion overlapping the plurality of drain extraction lines in the pixel with an insulation layer disposed therebetween; wherein
   at least two of the plurality of drain extraction lines overlap with a shared portion of the conductive portion of the pixel.

2. The active matrix substrate as claimed in claim 1, further comprising a gate bus line, wherein the conductive portion and the gate bus line are located in the same layer.

3. The active matrix substrate as claimed in claim 1, further comprising a plurality of storage capacitor upper electrodes and a plurality of storage capacitor lines, wherein, in the pixel, two of the plurality of storage capacitor lines each overlap with at least one of the plurality of storage capacitor upper electrodes with the insulation layer being disposed therebetween.

4. The active matrix substrate as claimed in claim 1, wherein, in each of the plurality of subpixels, one of the plurality of drain electrodes is electrically connected to, in order, at least one of the plurality of drain extraction lines, a contact hole, and a pixel electrode.

5. The active matrix substrate as claimed in claim 1, wherein one of the plurality of drain electrodes is connected to a storage capacitor upper electrode via one of the plurality of drain extraction lines.

6. The active matrix substrate as claimed in claim 1, wherein the plurality of drain extraction lines connect pixel electrodes provided in the plurality of subpixels to respective ones of the plurality of drain electrodes.

7. The active matrix substrate as claimed in claim 1, further comprising:
   a gate bus line including a gate electrode portion and a branched portion; and
   a drain conductive portion including the plurality of drain electrodes and the plurality of drain extraction lines; wherein
   a portion of the drain conductive portion overlaps with the branched portion; and
   another portion of the drain conductive portion overlaps with the gate electrode portion.

8. A display device comprising the active matrix substrate of claim 1.

9. The display device as claimed in claim 8, wherein at least two subpixels of the plurality of subpixels differ in brightness.

10. The display device as claimed in claim 8, wherein the display device is a liquid crystal display device.

11. The display device as claimed in claim 10, wherein the plurality of drain extraction lines partially overlap with an alignment controlling protrusion.

12. An active matrix substrate comprising:
   a pixel including:
      a plurality of drain extraction lines;
      a plurality of drain electrodes, each of the plurality of drain electrodes is connected at least one of the plurality of drain extraction lines; and
      a conductive portion overlapping with the plurality of drain extraction lines in the pixel with an insulation layer disposed therebetween; wherein
   at least two of the plurality of drain extraction lines overlap with a shared portion of the conductive portion of the pixel.

13. An active matrix substrate comprising:
   a gate bus line including a gate electrode portion of an active element and a branched portion;
   a drain conductive portion including:
      a drain electrode of the active element;
      a drain extraction line connected to the drain electrode; and
      an insulation layer disposed between the gate bus line and the drain conductive portion; wherein
   a portion of the drain conductive portion overlaps with the branched portion;
   another portion of the drain conductive portion overlaps with the gate electrode portion; and
   the branched portion overlapping with the portion of the drain conductive portion is electrically connected to the gate electrode portion overlapping with the another portion of the drain conductive portion.

14. The active matrix substrate as claimed in claim 13, further comprising a pixel including a plurality of subpixels, wherein one of the plurality of subpixels includes the drain electrode and the drain extraction line of the drain conductive portion, and each of the other subpixels of the plurality of subpixels includes a drain electrode corresponding to the drain electrode of the drain conductive portion and a drain extraction line corresponding to the drain extraction line of the drain conductive portion.

15. The active matrix substrate as claimed in claim 14, wherein, in each of the plurality of subpixels, the drain electrode of the respective subpixel is electrically connected to, in order, the drain extraction line of the respective subpixel, a contact hole, and a pixel electrode.

16. The active matrix substrate as claimed in claim 13, wherein the drain electrode is connected to a storage capacitor upper electrode via the drain extraction line.

17. A display device comprising the active matrix substrate of claim 13.

18. The display device as claimed in claim 17, further comprising a pixel including a plurality of subpixels differing in brightness.

19. The display device as claimed in claim 17, wherein the display device is a liquid crystal display device.

* * * * *